(12) United States Patent
Lai et al.

(10) Patent No.: US 12,384,875 B2
(45) Date of Patent: Aug. 12, 2025

(54) HIGH-PERFORMANCE LADDER POLYMERS FOR MEMBRANE GAS SEPARATION

(71) Applicants: Board of Trustees of the Leland Standford Junior University, Stanford, CA (US); Massachusetts Institute of Technology, Cambridge, MA (US)

(72) Inventors: Holden Wan Hong Lai, Stanford, CA (US); Jun Myun Ahn, Stanford, CA (US); Yan Xia, Stanford, CA (US); Zachary P. Smith, Cambridge, MA (US); Francesco M. Benedetti, Cambridge, MA (US)

(73) Assignees: The Board of Trustees of the Leland Stanford Junior University, Stanford, CA (US); Massachusetts Institute of Technology, Cambridge, MA (US)

( * ) Notice: Subject to any disclaimer, the term of this patent is extended or adjusted under 35 U.S.C. 154(b) by 481 days.

(21) Appl. No.: 17/771,434

(22) PCT Filed: Oct. 23, 2020

(86) PCT No.: PCT/US2020/057061
§ 371 (c)(1),
(2) Date: Apr. 22, 2022

(87) PCT Pub. No.: WO2021/101659
PCT Pub. Date: May 27, 2021

(65) Prior Publication Data
US 2022/0411574 A1 Dec. 29, 2022

Related U.S. Application Data

(60) Provisional application No. 62/926,004, filed on Oct. 25, 2019.

(51) Int. Cl.
*C08G 61/12* (2006.01)
*B01D 53/22* (2006.01)
*B01D 69/02* (2006.01)
*B01D 71/76* (2006.01)
*C08G 61/02* (2006.01)
*C09D 165/00* (2006.01)

(52) U.S. Cl.
CPC .......... *C08G 61/122* (2013.01); *B01D 69/02* (2013.01); *B01D 71/76* (2013.01); *C08G 61/02* (2013.01); *C08G 61/12* (2013.01); *C09D 165/00* (2013.01); B01D 53/228 (2013.01); B01D 2256/245 (2013.01); B01D 2257/504 (2013.01); C08G 2261/12 (2013.01); C08G 2261/1336 (2013.01); C08G 2261/1412 (2013.01); C08G 2261/312 (2013.01); C08G 2261/3142 (2013.01); C08G 2261/3242 (2013.01); C08G 2261/3243 (2013.01); C08G 2261/3324 (2013.01); C08G 2261/334 (2013.01); C08G 2261/3424 (2013.01); C08G 2261/344 (2013.01); C08G 2261/413 (2013.01); C08G 2261/612 (2013.01)

(58) Field of Classification Search
CPC .................. C08G 61/122; C08G 61/02; C08G 2261/1336; C08G 2261/3142; C08G 2261/3242; C08G 2261/344; C08G 61/12; C08G 2261/12; C08G 2261/1412; C08G 2261/312; C08G 2261/3243; C08G 2261/3324; C08G 2261/334; C08G 2261/3424; C08G 2261/413; C08G 2261/612; B01D 69/02; B01D 71/76; B01D 2256/245; B01D 53/228; B01D 2257/504; C09D 165/00
See application file for complete search history.

(56) References Cited

U.S. PATENT DOCUMENTS

| 10,076,728 B2 | 9/2018 | Song et al. |
| 2013/0267616 A1 | 10/2013 | McKeown et al. |
| 2016/0108169 A1 | 4/2016 | Xia et al. |

FOREIGN PATENT DOCUMENTS

| JP | 2017-509744 A | 4/2017 | |
| WO | WO-2012/035327 A1 | 3/2012 | |
| WO | WO-2020058850 A1 * | 3/2020 | ........... B01D 53/228 |

OTHER PUBLICATIONS

Abdulhamid, et al., "Microporous Polyimides from Ladder Diamines Synthesized by Facile Catalytic Arene-norbornene Annulation as High-performance Membranes for Gas Separation," Chemistry of Materials, 2019, vol. 31, No. 5, pp. 1767-1774.
Del Regno et al., Industrial & Engineering Chemistry Research, 2013, vol. 52, No. 47, pp. 16939-16950.
Foreign Action other than Search Report on Saudi Arabia Application No. 522432381 dated Jun. 4, 2023.
Foreign Search Report on PCT PCT/US2020/057061 Dtd Jul. 21, 2021.
Lai et al., "Functionalized Rigid Ladder Polymers from Catalytic Arene-norbornene Annulation Polymerization," ACS Macro Letters, 2017, vol. 6, No. 12, pp. 1357-1361.
Teo et al., "Synthesis of Ladder Polymers: Developments, Challenges, and Opportunities," Chemistry—a European Journal, 2017, vol. 23, No. 57, pp. 14101-14112.

(Continued)

*Primary Examiner* — Rabon A Sergent
(74) *Attorney, Agent, or Firm* — Foley & Lardner LLP

(57) ABSTRACT

Disclosed herein are ladder polymers comprising fused aromatic and non-aromatic rings. Also disclosed are the manufacture and use of these ladder polymers, e.g., in separation membranes, such as membrane for gas separation.

15 Claims, 13 Drawing Sheets

(56) References Cited

OTHER PUBLICATIONS

Extended Search Report on European Application No. 20889006.1 dated Sep. 26, 2023.
Lai et al., "Norbornyl Benzocyclobutene Ladder Polymers: Conformation and Microporosity," Journal of Polymer Science Part A: Polymer Chemistry, vol. 55, No. 18, 2017, pp. 3075-3081.
Official Action on Japanese Application No. 2022-523970 dated Sep. 13, 2024.
Foreign Action other than Search Report with English Translation on Korean Patent Application No. 10-2022-7015314 DTD Apr. 14, 2025, 10 pages.

\* cited by examiner

HIGH-PERFORMANCE LADDER POLYMERS FOR MEMBRANE GAS SEPARATION

CROSS-REFERENCE TO RELATED APPLICATIONS

This application is a 371 National Stage Entry of International Application No. PCT/US2020/057061, filed Oct. 23, 2020, which claims the benefit of and priority to U.S. Patent Application No. 62/926,004, filed on Oct. 25, 2019, the contents of which are incorporated herein in their entirety.

STATEMENT REGARDING FEDERALLY SPONSORED RESEARCH OR DEVELOPMENT

This invention was made with Government support under contract W911NF-16-1-0018 awarded by the U.S. Army Research Laboratory and under contract FELLOWSHIP-DGE-156518 awarded by the National Science Foundation. The Government has certain rights in the invention.

BACKGROUND

Industrial chemical separations account for about 10% of the world's energy consumption, presenting an urgent need for improved energy-efficient separation technologies. Compared to separation technologies such as distillation and absorption, membrane separation can be up to about ten times more energy-efficient. However, the widespread adoption of membrane-based separation has been constrained by two major challenges: the permeability/selectivity trade-off and plasticization.

An optimal membrane material for gas separation should possess both high permeability and selectivity. Permeability is a measure of a membrane's productivity. A highly permeable membrane would involve less material and thus have a smaller footprint. Selectivity is a measure of how effectively a membrane material can separate gas mixtures. In the context of natural gas purification, which primarily involves the separation of $CO_2$ from $CH_4$, a membrane with high selectivity results in greater $CH_4$ recovery. However, a trade-off relationship often exists between permeability and selectivity such that membranes with high permeability typically have low selectivity, and vice versa. This trade-off relationship is specified by the Robeson upper bounds. Polymeric membranes that can surpass the Robeson upper bounds have great potential as next-generation materials but are extremely rare.

Efforts to design polymeric materials that can surpass the upper bounds have largely focused on the synthesis of polymers containing ladder motifs referred to as polymers of intrinsic microporosity (PIMs). While some PIMs have surpassed the upper bounds due to their exceptionally high permeability, their selectivity remain low even after extended aging ($CO_2/CH_4$ < about 40).

Plasticization is another challenge in membrane separation that should be overcome. High-pressure feed streams (> about 10 atm) are often used for industrial gas separations. Under these conditions, large concentration of gas molecules are sorbed in a membrane, leading to softening of the membrane and thus increase in permeability with concomitant decrease in selectivity.

It is against this background that a need arose to develop the embodiments described herein.

SUMMARY OF THE DISCLOSURE

Certain aspects of the disclosure include a ladder polymer comprising multiple moieties each represented by:

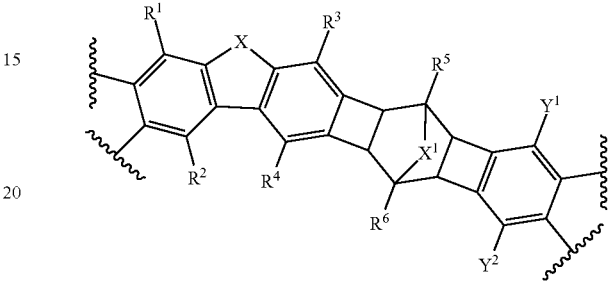

wherein, X is selected from alkylene groups, —[O]—, —[S]—, nitrogen-containing groups, and cyclic groups, wherein $Y^1$ and $Y^2$ are independently selected from alkyl groups, wherein $R^1$, $R^2$, $R^3$, $R^4$, $R^5$, and $R^6$ are independently selected from hydride group, alkyl groups, aryl groups, heterocyclic groups, halogen groups, groups including a —O— moiety, groups including a —O(CO)— moiety, groups including a —O(CO)O— moiety, groups including a —O(CO)N< moiety), groups including a —S— moiety, groups including a —B< moiety, —$NO_2$, groups including a —N< moiety, groups including a —P< moiety, groups including a —(PO)< moiety, —CHO, groups including a —(CO)— moiety, groups including a —(CO)O— moiety, groups including a —(CO)N< moiety, and groups including a moiety, and wherein $X^1$ is selected from —[O]—, —[S]—, —[B(O)$R^a$]—, —[N$R^a$]—, —[P(O)$R^a$]—, —[(PO)(O)$R^a$]—, —[CO]—, —[C$R^a R^b$]—, —[C(O)$R^a$(O)$R^b$]—, and —[Si(O)$R^a$(O)$R^b$]—, and $R^a$ and $R^b$ are independently selected from hydride group, alkyl groups, aryl groups, and heterocyclic groups. In some embodiments, $Y^1$=$Y^2$, $X^1$ is —[$CH_2$]—, and $R^1$=$R^2$=$R^3$=$R^4$=$R^5$=$R^6$=hydride group. In some embodiments, the ladder polymer is represented by:

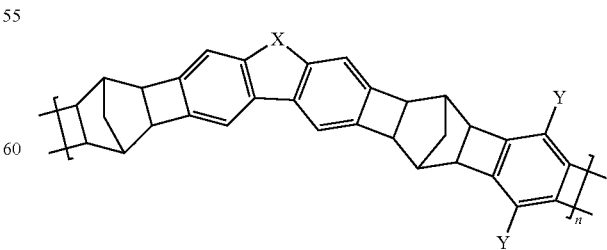

wherein n is an integer that is greater than 1. In some embodiments, the ladder polymer is represented by.

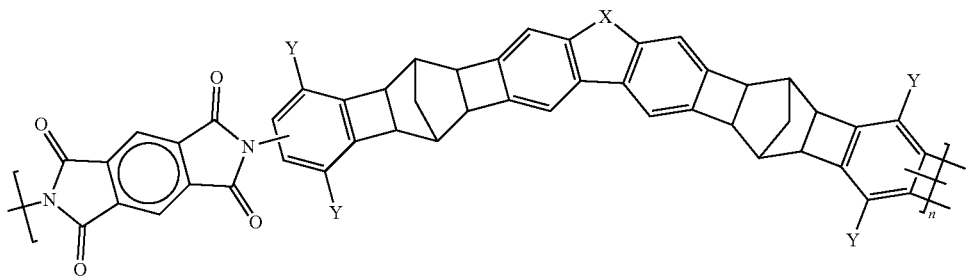

wherein

 = aromatic group, and wherein n is an integer that is greater than 1. In some embodiments, the ladder polymer is represented by.

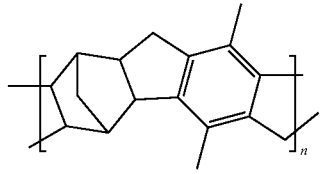

wherein n is an integer that is greater than 1.

Additional embodiments include a ladder polymer comprising multiple moieties each represented by:

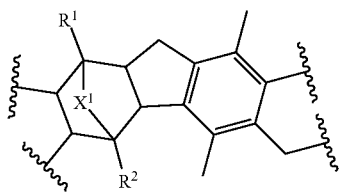

wherein $R^1$ and $R^2$ are independently selected from hydride group, alkyl groups, aryl groups, heterocyclic groups, halogen groups, groups including a —O— moiety, groups including a —O(CO)— moiety, groups including a —O(CO)O— moiety, groups including a —O(CO)N< moiety), groups including a —S— moiety, groups including a —B< moiety, —NO$_2$, groups including a —N< moiety, groups including a —P< moiety, groups including a —(PO)< moiety, —CHO, groups including a —(CO)— moiety, groups including a —(CO)O— moiety, groups including a —(CO)N< moiety, and groups including a —Si≡ moiety, and wherein $X^1$ is selected from —[O]—, —[S]—, —[B(O)R$^a$]—, —[NR$^a$]—, —[P(O)R$^a$]—, —[(PO)(O)R$^a$]—, —[CO]—, —[CR$^a$R$^b$]—, —[C(O)R$^a$(O)R$^b$]—, and —[Si(O)R$^a$(O)R$^b$]—, and R$^a$ and R$^b$ are independently selected from hydride group, alkyl groups, aryl groups, and heterocyclic groups. In some embodiments, $R^1$=$R^2$=hydride group, and $X^1$ is —[CH$_2$]—. In some embodiments, the ladder polymer is represented by:

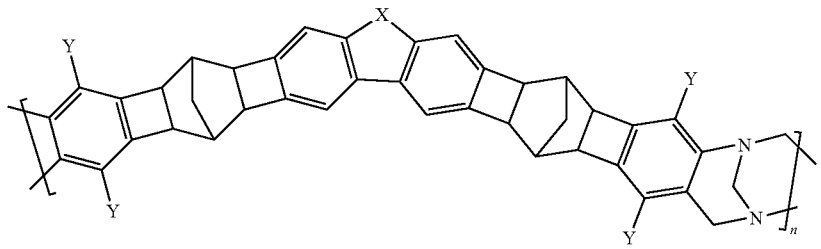

wherein n is an integer that is greater than 1. In some embodiments, the ladder polymer is represented by:

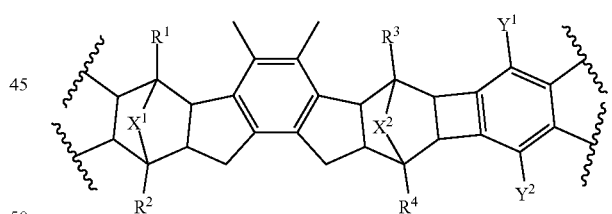

wherein $Y^1$ and $Y^2$ are independently selected from alkyl groups, wherein $R^1$, $R^2$, $R^3$, and $R^4$ are independently selected from hydride group, alkyl groups, aryl groups, heterocyclic groups, halogen groups, groups including a —O— moiety, groups including a —O(CO)— moiety, groups including a —O(CO)O— moiety, groups including a —O(CO)N< moiety), groups including a —S— moiety, groups including a —B< moiety, —NO$_2$, groups including a —N< moiety, groups including a —P< moiety, groups including a —(PO)< moiety, —CHO, groups including a —(CO)— moiety, groups including a —(CO)O— moiety, groups including a —(CO)N< moiety, and groups including a —Si≡ moiety, and wherein $X^1$ and $X^2$ are independently selected from —[O]—, —[S]—, —[B(O)R$^a$]—, —[NR$^a$]—, —[P(O)R$^a$]—, —[(PO)(O)R$^a$]—, —[CO]—, —[CR$^a$R$^b$]—, —[C(O)R$^a$(O)R$^b$]—, and —[Si(O)R$^a$(O)R$^b$]—, and R$^a$ and $R^b$ are independently selected from hydride group, alkyl groups, aryl groups, and heterocyclic groups. In some embodiments, $R^1=R^2=R^3=R^4=$hydride group, $X^1=X^2=-[CH_2]-$, and $Y^1=Y^2=-CH_3$. In some embodiments, the ladder polymer is represented by:

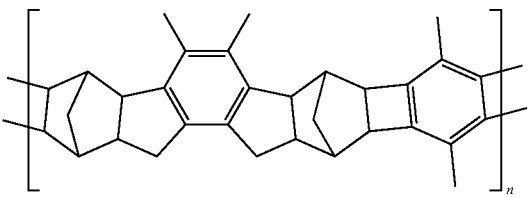

n wherein n is an integer that is greater than 1.

Additional embodiments include a membrane for gas separation, comprising the ladder polymer of any of these embodiments.

DETAILED DESCRIPTION

Figure 1:
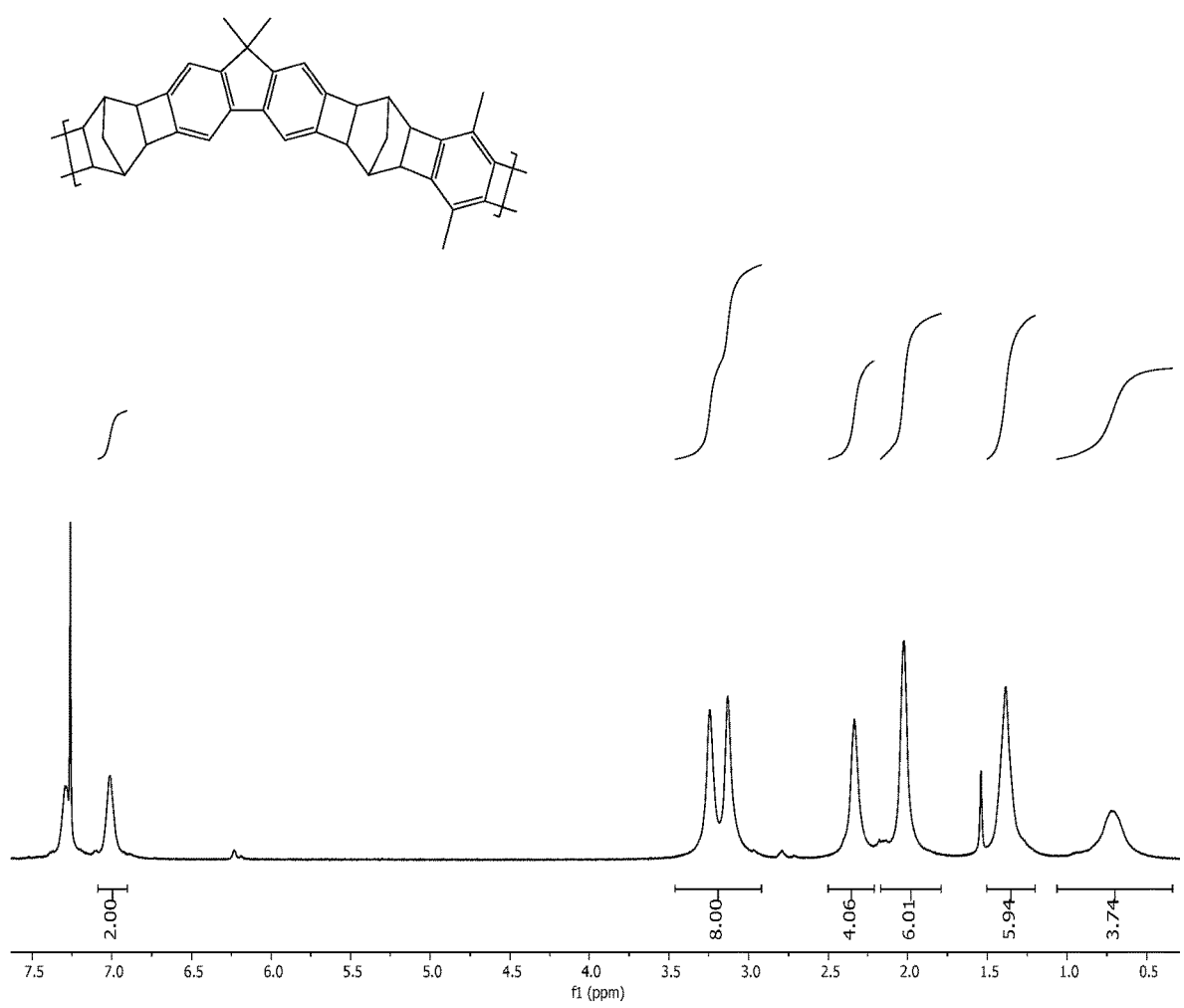
FIG. 1 shows the structure and $^1$H-NMR of CANAL-Me-DMF.

In some embodiments, a ladder polymer includes multiple moieties each represented by the following chemical formula:

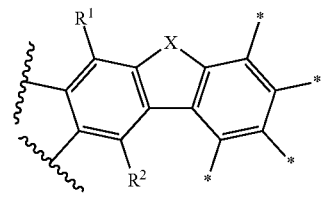

where two adjacent * are bonds to the two stars on

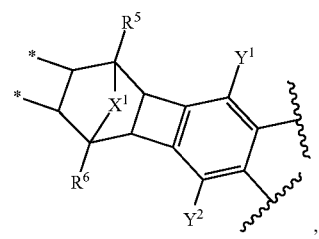

and the remaining two * are $R^3$ and $R^4$. Examples of compounds of formula (1) include:

(1)

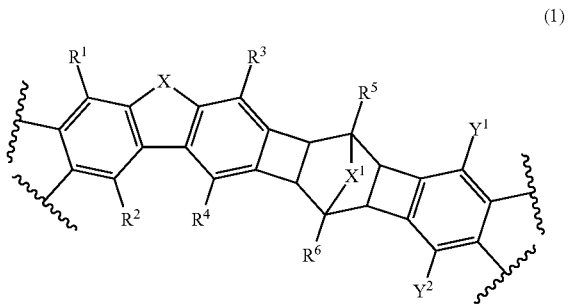

-continued

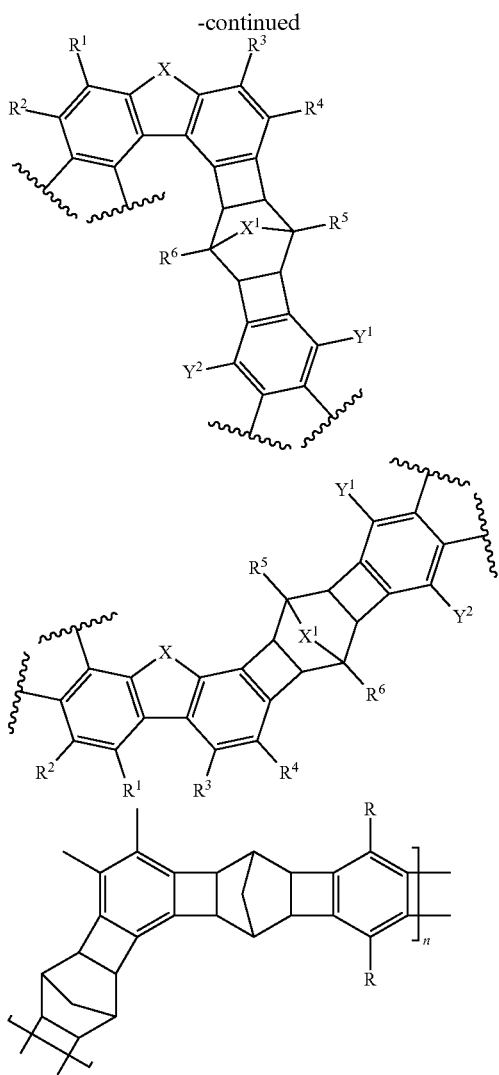

In formula (1), X is selected from bridging moieties such as: alkylene groups (including alkylene groups that are substituted and unsubstituted, and that are halogenated and unhalogenated), such as —[CH$_2$]—, —[C(CH$_3$)$_2$]—, and —[C(CF$_3$)$_2$]—, —[O]—, —[S]—, nitrogen-containing groups, such as —[N-butyloxycarbonyl]—, —[N-acetate]—, —[N(CH$_3$)]—, and —[NC(CH$_3$)$_3$]—, cyclic groups (including cyclic groups that are substituted and unsubstituted, and that are aromatic and nonaromatic), such as

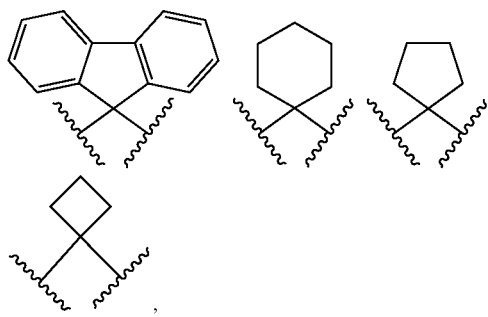

, and other groups including at least one oxygen atom, at least one sulfur atom, at least one nitrogen atom, or at least one carbon atom.

In formula (1), $Y^1$ and $Y^2$ can be the same or different, and can be independently selected from substituents such as alkyl groups (including alkyl groups that are substituted and unsubstituted, and that are halogenated and unhalogenated), such as —CH$_3$, —CH$_2$CH$_3$, —CH(CH$_3$)$_2$, and —C(CH$_3$)$_3$.

In formula (1), $R^1$, $R^2$, $R^3$, $R^4$, $R^5$, and $R^6$ can be the same or different, and can be independently selected from substituents such as hydride group, alkyl groups (including alkyl groups that are substituted and unsubstituted, and that are halogenated and unhalogenated), aryl groups (including aryl groups that are substituted and unsubstituted), heterocyclic groups (including heterocyclic groups that are substituted and unsubstituted), halogen groups, —OR$^a$ (or other groups including a —O— moiety), —O(CO)R$^a$ (or other groups including a —O(CO)— moiety), —O(CO)OR$^a$ (or other groups including a —O(CO)O— moiety), —O(CO)NR$^a$R$^b$ (or other groups including a —O(CO)N< moiety), —SR$^a$ (or other groups including a —S— moiety), —B(O)R$^a$(O)R$^b$ (or other groups including a —B< moiety), —NO$_2$, —NR$^a$R$^b$ (or other groups including a —N< moiety), —P(O)R$^a$(O)R$^b$ (or other groups including a —P< moiety), —PO(O)R$^a$(O)R$^b$ (or other groups including a —(PO)< moiety), —CHO, —(CO)R$^a$ (or other groups including a —(CO)— moiety), —(CO)OR$^a$ (or other groups including a —(CO)O— moiety), —(CO)NR$^a$R$^b$ (or other groups including a —(CO)N< moiety), and —Si(O)R$^a$(O)R$^b$(O)R$^c$ (or other groups including a —Si— moiety); $X^1$ is selected from bridging moieties such as —[O]—, —[S]—, —[B(O)R$^d$]—, —[NR$^d$]—, —[P(O)R$^d$]—, —[(PO)(O)R$^d$]—, —[CO]—, —[CR$^d$R$^e$]—, —[C(O)R$^d$(O)R$^e$]—, —[Si(O)R$^d$(O)R$^e$]—, and other groups including at least one oxygen atom, at least one sulfur atom, at least one boron atom, at least one nitrogen atom, at least one phosphorus atom, or at least one carbon atom; and where R$^a$, R$^b$, R$^c$, R$^d$, and R$^e$ can be the same or different, and can be independently selected from substituents such hydride group, alkyl groups (including alkyl groups that are substituted and unsubstituted), aryl groups (including aryl groups that are substituted and unsubstituted), and heterocyclic groups (including heterocyclic groups that are substituted and unsubstituted).

In some embodiments, the molecular weight (Mw) of the polymer is about 50 to about 250 kDa as determined by GPC MALLS, such as about 70 to about 170 kDa.

An example of a ladder polymer given by formula (1) is represented by the following chemical formula (or positional isomers thereof):

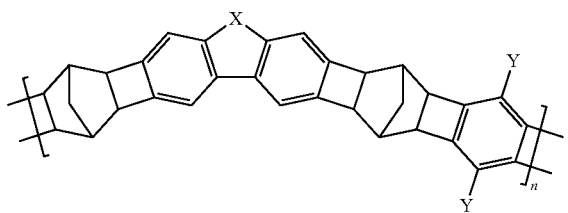

(2)

As noted above, positional isomers of formula (2) include where one or more cyclobutyl is shifted positionally, e.g., to adjacent carbon atoms, as represented by the * in the following:

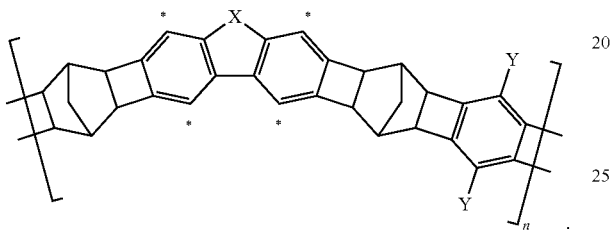

In formula (2), X is selected from bridging moieties as noted above for formula (1), $Y^1=Y^2=Y$ which is selected from substituents as noted above for formula (1), $X^1$ is $-[CH_2]-$, $R^1=R^2=R^3=R^4=R^5=R^6=$hydride group, and n is an integer that is greater than 1, such as 2 or greater, 3 or greater, 4 or greater, 5 or greater, 10 or greater, 20 or greater, 50 or greater, or 100 or greater.

In some embodiments, the ladder polymer of formula (2) is synthesized by reacting a dihalo (e.g., dibromo) fluorene derivative with norbornadiene through catalytic arene-nobornene annulation (e.g., in the presence of a palladium catalyst) to form fluorene dinorbornene, followed by polymerization with a di-Y substituted, dihalo (e.g., dibromo) benzene to form the ladder polymer.

Another example of a ladder polymer given by formula (1) is represented by the following chemical formula (or positional isomers thereof):

As noted above, positional isomers of formula (3) include where one or more cyclobutyl is shifted positionally, e.g., to adjacent carbon atoms.

In formula (3), X is selected from bridging moieties as noted above for formula (1), $Y^1=Y^2=Y$ which is selected from substituents as noted above for formula (1), $X^1$ is $-[CH_2]-$, $R^1=R^2=R^3=R^4=R^5=R^6=$hydride group, n is an integer that is greater than 1, such as 2 or greater, 3 or greater, 4 or greater, 5 or greater, 10 or greater, 20 or greater, 50 or greater, or 100 or greater, and

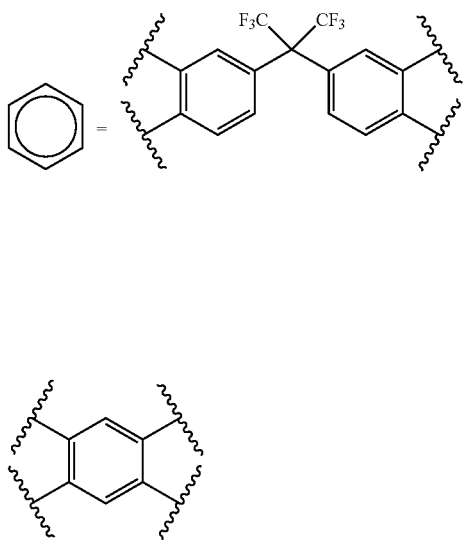

or other aromatic groups (including those that are substituted and unsubstituted, and that are halogenated and unhalogenated).

In some embodiments, the ladder polymer of formula (3) is synthesized by reacting a dihalo (e.g., dibromo) fluorene derivative with norbornadiene through catalytic arene-nobornene annulation (e.g., in the presence of a palladium catalyst) to form fluorene dinorbornene, followed by reacting with a di-Y substituted, halo (e.g., bromo), amino benzene to form a fluorene norbornyl benzocyclobutene diamine, followed by polymerization with a dianhydride to form the ladder polymer.

A further example of a ladder polymer given by formula (1) is represented by the following chemical formula (or positional isomers thereof).

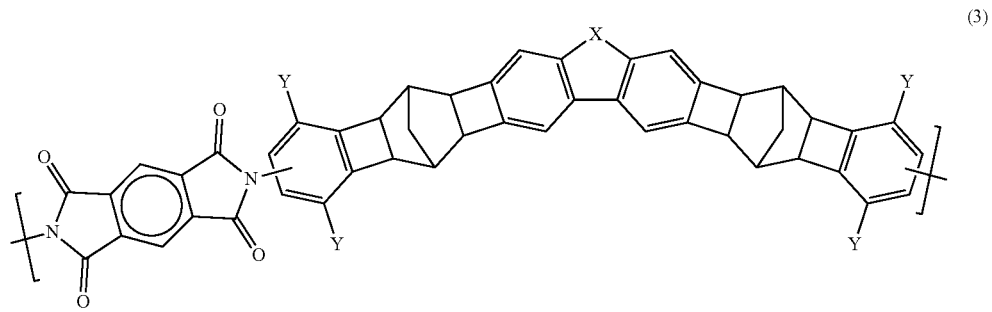

(3)

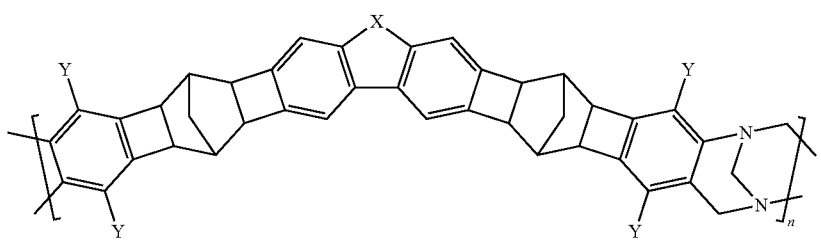

(4)

As noted above, positional isomers of formula (4) include where one or more cyclobutyl is shifted positionally, e.g., to adjacent carbon atoms.

In formula (4), X is selected from bridging moieties as noted above for formula (1), $Y^1=Y^2=Y$ which is selected from substituents as noted above for formula (1), $X^1$ is —[CH$_2$]—, $R^1=R^2=R^3=R^4=R^5=R^6$=hydride group, and n is an integer that is greater than 1, such as 2 or greater, 3 or greater, 4 or greater, 5 or greater, 10 or greater, 20 or greater, 50 or greater, or 100 or greater.

In some embodiments, the ladder polymer of formula (4) is synthesized by reacting a dihalo (e.g., dibromo) fluorene derivative with norbornadiene through catalytic arene-nobornene annulation (e.g., in the presence of a palladium catalyst) to form fluorene dinorbornene, followed by reacting with a di-Y substituted, halo (e.g., bromo), amino benzene to form a fluorene norbornyl benzocyclobutene diamine, followed by polymerization with dimethoxy methane to form the ladder polymer.

In additional embodiments, a ladder polymer includes multiple moieties each represented by the following chemical formula (or positional isomers thereof).

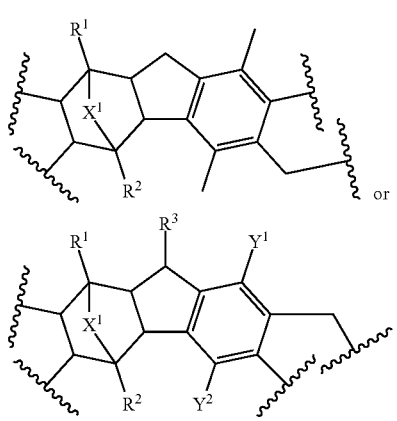

(5)

In formula (5), $R^1$ and $R^2$ can be the same or different, and can be independently selected from substituents such as hydride group, alkyl groups (including alkyl groups that are substituted and unsubstituted, and that are halogenated and unhalogenated), aryl groups (including aryl groups that are substituted and unsubstituted), heterocyclic groups (including heterocyclic groups that are substituted and unsubstituted), halogen groups, —OR$^a$ (or other groups including a —O— moiety), —O(CO)R$^a$ (or other groups including a —O(CO)— moiety), —O(CO)OR$^a$ (or other groups including a —O(CO)O— moiety), —O(CO)NR$^a$R$^b$ (or other groups including a —O(CO)N< moiety), —SR$^a$ (or other groups including a —S— moiety), —B(O)R$^a$(O)R$^b$ (or other groups including a —B< moiety), —NO$_2$, —NR$^a$R$^b$ (or other groups including a —N< moiety), —P(O)R$^a$(O)R$^b$ (or other groups including a —P< moiety), —PO(O)R$^a$(O)R$^b$ (or other groups including a —(PO)< moiety), —CHO, —(CO)R$^a$ (or other groups including a —(CO)— moiety), —(CO)OR$^a$ (or other groups including a —(CO)O— moiety), —(CO)NR$^a$R$^b$ (or other groups including a —(CO)N< moiety), and —Si(O)R$^a$(O)R$^b$(O)R$^c$ (or other groups including a —Si= moiety); $X^1$ is selected from bridging moieties such as —[O]—, —[S]—, —[B(O)R$^d$]—, —[NR$^d$]—, —[P(O)R$^d$]—, —[(PO)(O)R$^d$]—, —[CO]—, —[CR$^d$R$^e$]—, —[C(O)R$^d$(O)R$^e$]—, —[Si(O)R$^d$(O)R$^e$]—, and other groups including at least one oxygen atom, at least one sulfur atom, at least one boron atom, at least one nitrogen atom, at least one phosphorus atom, or at least one carbon atom; and where R$^a$, R$^b$, R$^c$, R$^d$, and R$^e$ can be the same or different, and can be independently selected from substituents such hydride group, alkyl groups (including alkyl groups that are substituted and unsubstituted), aryl groups (including aryl groups that are substituted and unsubstituted), and heterocyclic groups (including heterocyclic groups that are substituted and unsubstituted).

An example of a ladder polymer given by formula (5) is represented by the following chemical formula (or positional isomers thereof):

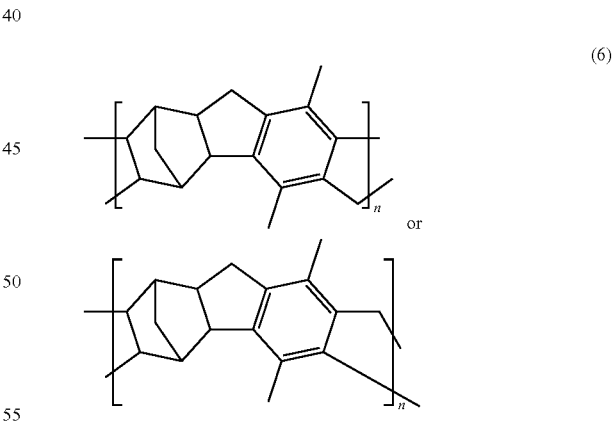

(6)

In formula (6), $R^1=R^2$=hydride group, $X^1$ is —[CH$_2$]—, and n is an integer that is greater than 1, such as 2 or greater, 3 or greater, 4 or greater, 5 or greater, 10 or greater, 20 or greater, 50 or greater, or 100 or greater.

In some embodiments, the ladder polymer of formula (6) is synthesized by reacting 1,4 dihalo (e.g., dibromo) durene with norbornadiene to form dinorbornene, followed by polymerization through catalytic arene-nobornene annulation (e.g., in the presence of a palladium catalyst) with a dihalo (e.g., dibromo) substituted durene to form the ladder polymer.

In further embodiments, a ladder polymer includes multiple moieties each represented by the following chemical formula (or positional isomers thereof):

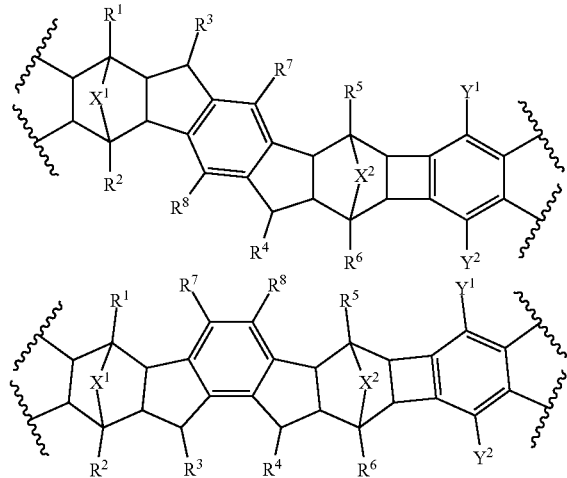

(7)

In formula (7), $Y^1$ and $Y^2$ can be the same or different, and can be independently selected from substituents such as alkyl groups (including alkyl groups that are substituted and unsubstituted, and that are halogenated and unhalogenated), such as —$CH_3$, —$CH_2CH_3$, —$CH(CH_3)_2$, and —$C(CH_3)_3$.

In formula (7), $R^1$, $R^2$, $R^3$, $R^4$ $R^5$, $R^6$, $R^7$ and $R^8$ can be the same or different, and can be independently selected from substituents such as hydride group, alkyl groups (including alkyl groups that are substituted and unsubstituted, and that are halogenated and unhalogenated), aryl groups (including aryl groups that are substituted and unsubstituted), heterocyclic groups (including heterocyclic groups that are substituted and unsubstituted), halogen groups, —$OR^a$ (or other groups including a —O— moiety), —$O(CO)R^a$ (or other groups including a —O(CO)— moiety), —$O(CO)OR^a$ (or other groups including a —O(CO)O— moiety), —$O(CO)NR^aR^b$ (or other groups including a —O(CO)N< moiety), —$SR^a$ (or other groups including a —S— moiety), —$B(O)R^a(O)R^b$ (or other groups including a —B< moiety), —$NO_2$, —$NR^aR^b$ (or other groups including a —N< moiety), —$P(O)R^a(O)R^b$ (or other groups including a —P< moiety), —$PO(O)R^a(O)R^b$ (or other groups including a —(PO)< moiety), —CHO, —$(CO)R^a$ (or other groups including a —(CO)— moiety), —$(CO)OR^a$ (or other groups including a —(CO)O— moiety), —$(CO)NR^aR^b$ (or other groups including a —(CO)N< moiety), and —$Si(O)R^a(O)R^b(O)R^c$ (or other groups including a —Si≡ moiety); $X^1$ and $X^2$ can be the same or different, and can be independently selected from bridging moieties such as —[O]—, —[S]—, —[B(O)$R^d$]—, —[$R^d$]—, —[P(O)$R^d$]—, —[(PO)(O)$R^d$]—, —[CO]—, —[$CR^dR^e$]—, —[C(O)$R^d$(O)$R^e$]—, —[Si(O)$R^d$(O)$R^e$]—, and other groups including at least one oxygen atom, at least one sulfur atom, at least one boron atom, at least one nitrogen atom, at least one phosphorus atom, or at least one carbon atom; and where $R^a$, $R^b$, $R^c$, $R^d$, and $R^e$ can be the same or different, and can be independently selected from substituents such hydride group, alkyl groups (including alkyl groups that are substituted and unsubstituted), aryl groups (including aryl groups that are substituted and unsubstituted), and heterocyclic groups (including heterocyclic groups that are substituted and unsubstituted).

In some embodiments, the compound of formula (7) is:

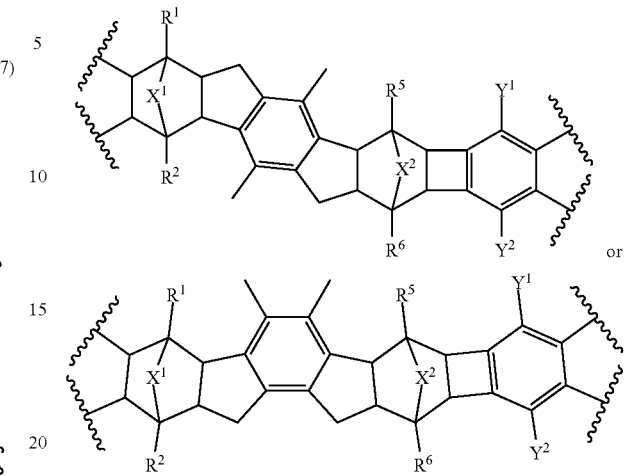

An example of a ladder polymer given by formula (7) is represented by the following chemical formula (or positional isomers thereof):

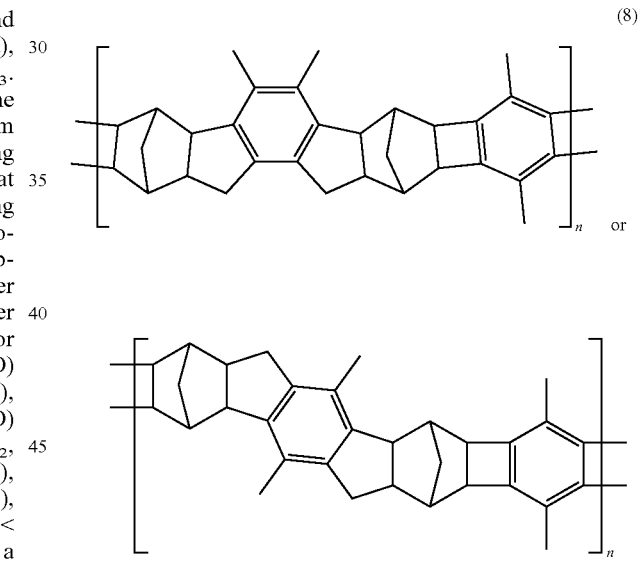

(8)

In formula (8), $R^1=R^2=R^3=R^4$=hydride group, $X^1=X^2$=—[$CH_2$]—, $Y^1=Y^2=CH_3$, and n is an integer that is greater than 1, such as 2 or greater, 3 or greater, 4 or greater, 5 or greater, 10 or greater, 20 or greater, 50 or greater, or 100 or greater.

In some embodiments, the ladder polymer of formula (8) is synthesized by reacting 1,4 dihalo (e.g., dibromo) durene with norbornadiene to form dinorbornene, followed by polymerization through catalytic arene-nobornene annulation (e.g., in the presence of a palladium catalyst) with a dihalo (e.g., dibromo) substituted xylene to form the ladder polymer.

In further embodiments, a ladder polymer includes multiple moieties each represented by the following chemical formula (or positional isomers thereof):

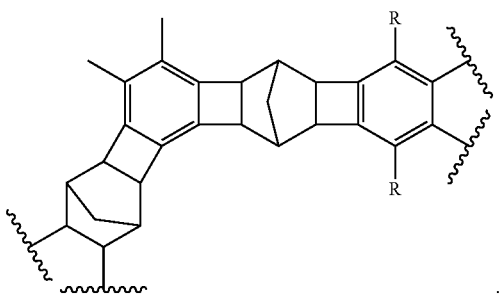

For example, this formula includes ladder polymers represented by the following chemical formula:

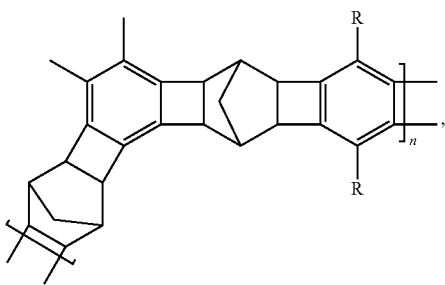

wherein R is the same as $R^1$ for formula (1), and n is an integer that is greater than 1, such as 2 or greater, 3 or greater, 4 or greater, 5 or greater, 10 or greater, 20 or greater, 50 or greater, or 100 or greater.

Ladder polymers of embodiments of this disclosure are useful as materials for a number of applications, including as membranes for separation of gases or other liquid or dissolved materials. Embodiments, therefore, include membranes for separation of gases or other liquid or dissolved materials comprising one or more ladder polymer of an embodiment of this disclosure. In some embodiments, the one or more ladder polymer is in the form of a membrane. In some embodiments, the membrane is about 20 to about 200 m thick, e.g., about 20, 30, 40, 50, 60, 70, 80, 90, 100, 110, 120, 130, 140, 150, 160, 170, 180, 190 or 200 m thick.

EXAMPLES

The following example describes specific aspects of some embodiments of this disclosure to illustrate and provide a description for those of ordinary skill in the art. The example should not be construed as limiting this disclosure, as the example merely provides specific methodology useful in understanding and practicing some embodiments of this disclosure.

Characterization Methods. $^1$H and $^{13}$C NMR experiments were performed in $CDCl_3$ using a Varian Mercury 400. Chemical shifts are reported in ppm using the residual protiated solvent as an internal standard ($CHCl_3$ $^1$H: 7.26 ppm and $^{13}$C: 77.00 ppm). Data are reported as follows: chemical shift, multiplicity (s=singlet, m=multiplet, br=broad signal, and associated combinations), and integration. Gel permeation chromatography (GPC) was carried out in THF on two PolyPore columns (Agilent) connected in series with a DAWN multiangle laser light scattering (MALLS) detector and an Optilab T-rEX differential refractometer (both from Wyatt Technology). No calibration standards were used, and dn/dc values were obtained for each injection by assuming 100% mass elution from the columns. Electron ionization (EI) mass spectrometry was performed on an Agilent (HP) 7890/5975 single quadrupole GC-MS system. Thermogravimetric analysis (TGA) was performed on a TA instruments TGA 550 under nitrogen flowing at 25 mL/min. Samples were heated at 10° C./min from 30° C. up to 600° C. Polymer film densities were determined using a Mettler Toledo analytical balance density kit. Deionized water was used as the buoyant liquid because of the hydrophobic nature of the hydrocarbon ladder polymers, which prevents water uptake. FFV was calculated using Bondi's group contribution method.[1] Wide-angle X-ray scattering (WAXS) experiments were performed under vacuum on a system with a Rigaku 002 Cu microfocus X-ray source with an Osmic staggered parabolic multilayer optics. The WAXS instrument is equipped with the Dectris Pilatus 300K detector Materials. HPLC-grade tetrahydrofuran (THF) was purchased from commercial vendors and sparged with nitrogen before being transferred into a glovebox and used for polymerization reactions. All other reagents were obtained from commercial vendors and used as received. 2',7'-Dibromo-spiro(cyclohexane-1,9'-fluorene), 2',7'-dibromo-spiro(cyclopentane-1,9'-fluorene), and 2,7-dibromo-9,10-dihydrophenanthrene were synthesized according to literature procedures.

General Procedure for the Synthesis of Dinorbornene. Synthesized following our previously reported procedure. To a flame-dried glass pressure tube was added the aryl dibromide (1 equiv.), $Pd(OAc)_2$ (0.04 equiv.), and $PPh_3$ (0.08 equiv.). The tube was transferred into a nitrogen-filled glovebox, and $Cs_2CO_3$ (2 equiv.), norbornadiene (10 equiv.), and 1,4-dioxane (1 mL/mmol of aryl dibromide) was added. The tube was then sealed with a Teflon cap and taken out of the glovebox. After the mixture was stirred at 150° C. for 48 h, it was cooled to room temperature and then passed through Celite to remove inorganic salt, which was washed with $CHCl_3$ (3×15 mL). Filtered solution was concentrated and purified by silica chromatography to yield the dinornornenes as a mixture of syn and anti isomers.

Synthesis and Permeation Experiments:

This example reports the synthesis and characterization of a norbornyl benzocyclobutene (NBC) ladder polymer containing five-membered rings that performs beyond the Robeson upper bounds for multiple industrially relevant gas pairs and is plasticization-resistant at high $CO_2$ pressure. This material has more than about double the ideal selectivity of industrial membranes such as cellulose acetate, and with nearly three orders of magnitude higher permeability. It also has the highest selectivity for $CO_2/CH_4$, $H_2/CH_4$, $H_2/N_2$, and $H_2/CO_2$ among reported ladder polymers to date.

Two types of NBC ladder polymers containing five-membered rings are reported: fluorene-containing and norbornyl benzocyclopentene-containing NBC ladder polymers. The fluorene NBC ladder polymers can be synthesized in two stages. Dibromo fluorene derivatives are first reacted with norbornadiene through the catalytic arene-nobornene annulation (CANAL) to form fluorene dinorbornenes, followed by polymerization with dialkyl dibromobenzenes to form ladder polymers (fluorene NBC ladder, Scheme 1). Fluorene NBC diamines can also be synthesized and subsequently polymerized with dimethoxy methane or dianhydrides to yield Troger's base polymer (fluorene NBC TB, Scheme 1) or polyimides (fluorene NBC PI, Scheme 1), respectively. The synthesis of nobornyl benzocyclopentene-containing NBC polymers involves the benzylic activation of 1,4-dibromo durene to yield dinorbornene, followed by CANAL polymerization (Scheme 2).

Scheme 1. Synthesis of fluorene-containing NBC ladder polymers.
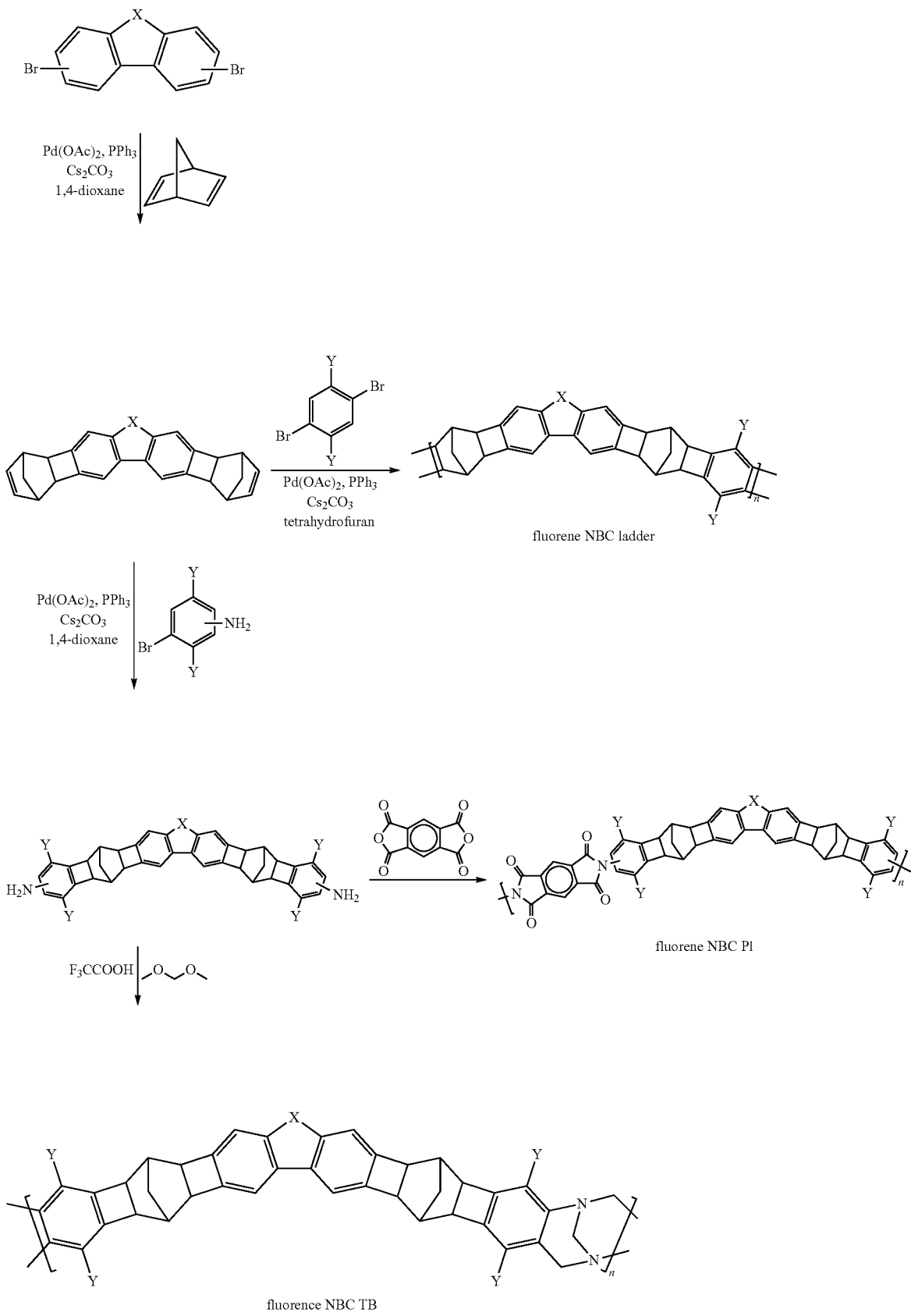

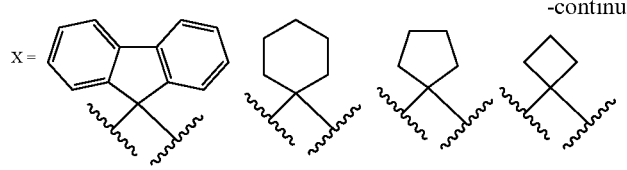

CH$_2$, C(CH$_3$)$_2$, C(CF$_3$)$_2$
O, S
NBoc, NAc, NCH$_3$, NCH(CH$_3$)$_2$, NC(CH$_3$)$_3$, etc.
Y = CH$_3$, CH$_2$CH$_3$, CH(CH$_3$)$_2$, C(CH$_3$)$_3$

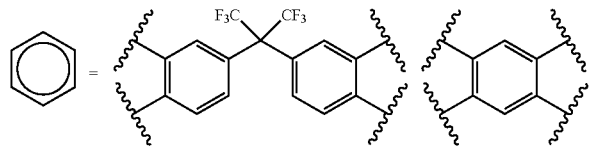

Scheme 2. Synthesis of NBC ladder polymers containing norbornyl benzocyclopentene.

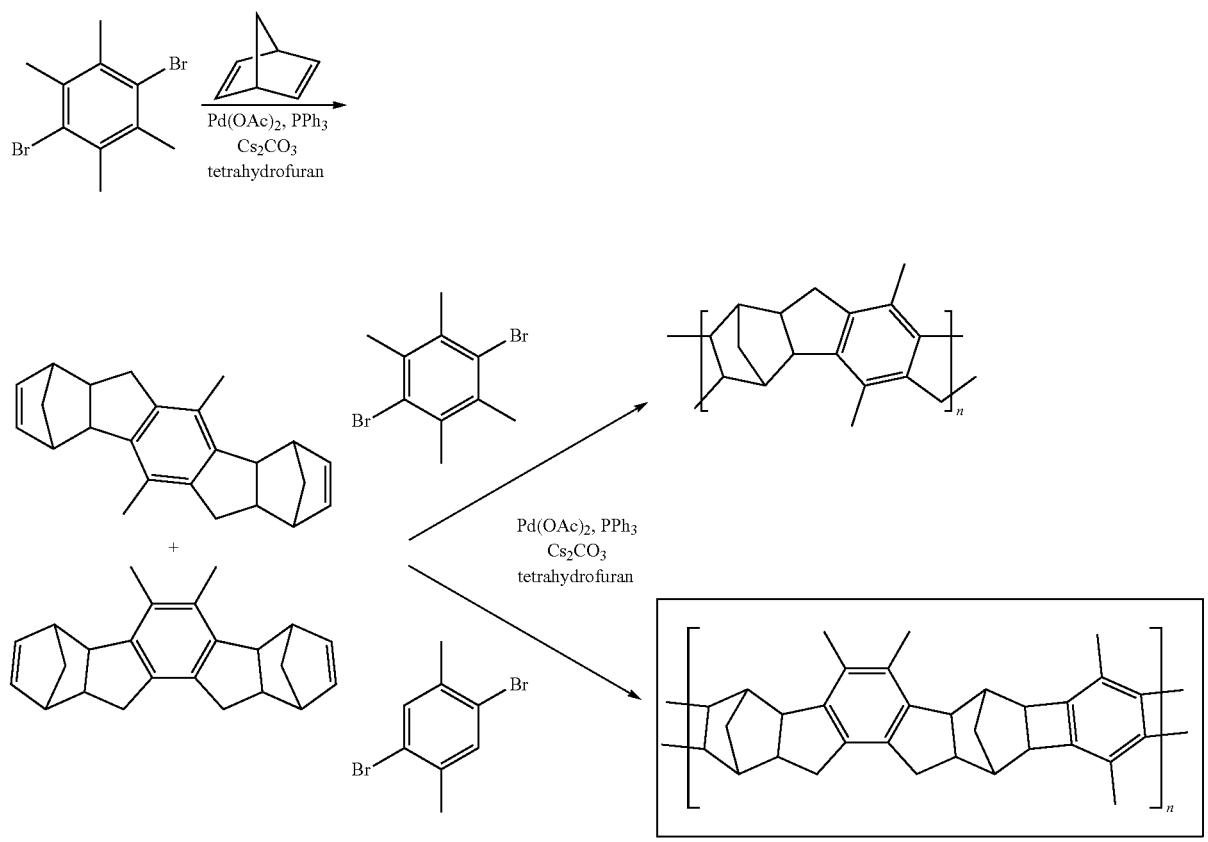

One example of a fluorene NBC ladder polymer, CANAL-Me-DMF, was synthesized. Its chemical structure and $^1$H-nuclear magnetic resonance (NMR) spectrum are shown in FIG. 1.

DMF.

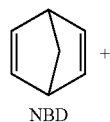

NBD

-continued

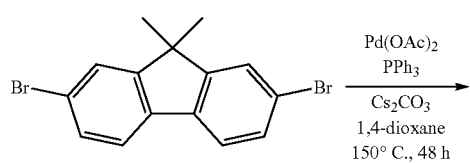

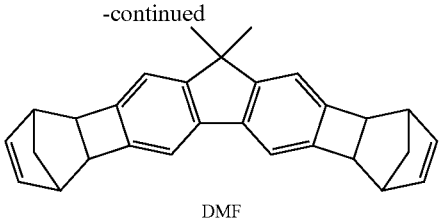

DMF

Reaction was performed with 5 mmol of 2,7-dibromo-9,9-dimethylfluorene. Purified by silica chromatography using mobile phase 9/1 hexanes/dichloromethane (DCM) to yield DMF as an off-white solid (1.1 g, 59%). $^1$H NMR (400 MHz, CDCl$_3$) δ 7.43 (s, 1H), 7.41 (s, 1H), 7.15 (s, 1H), 7.14 (s, 1H), 6.25 (s, 4H), 3.16 (s, 4H), 2.83 (m, 4H), 1.53-1.39 (m, 6H), 1.34-1.25 (m, 2H), 0.95-0.99 (m, 2H); $^{13}$C NMR (100 MHz, CDCl$_3$) δ 153.1, 153.0, 145.1, 145.0, 144.7, 144.6, 138.9, 138.8, 136.94, 136.92, 136.90, 136.88, 116.54, 116.48, 113.22, 113.21, 47.07, 47.05, 46.84, 46.76, 46.7, 41.96, 41.95, 41.9, 41.64, 41.60, 28.2, 28.0, 27.7. EI-MS m/z Calcd for C$_{29}$H$_{26}$$^+$: 374.2, found: 374.2.
S5F.

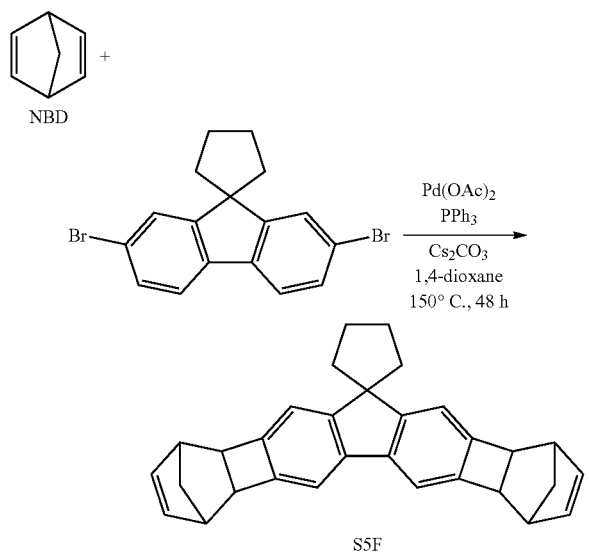

S5F

Reaction performed with 1.5 mmol of 2',7'-dibromo-spiro (cyclopentane-1,9'-fluorene). Purified by silica chromatography using mobile phase 19/1 hexanes/DCM to yield S5F as an off-white solid (360 mg, 75%). $^1$H NMR (600 MHz, CDCl$_3$) δ 7.70-7.38 (m, 2H), 7.13-7.12 (m, 2H), 6.25 (s, 4H), 3.15-3.14 (m, 4H), 2.83-2.81 (m, 4H), 2.13-2.02 (m, 8H), 1.31-1.29 (m, 2H), 0.99-0.96 (m, 2H); $^{13}$C NMR (150 MHz, CDCl$_3$): δ 153.74, 153.70, 145.15, 145.04, 144.23, 144.17, 138.99, 138.95, 136.77, 136.75, 136.71, 136.69, 116.61, 116.56, 112.65, 112.64, 57.52, 57.49, 46.95, 46.92, 46.64, 41.82, 41.80, 41.75, 41.74, 41.46, 41.43, 40.69, 40.24, 39.82, 27.14, 27.09, 27.05.
S6F.

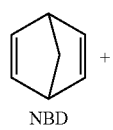

NBD

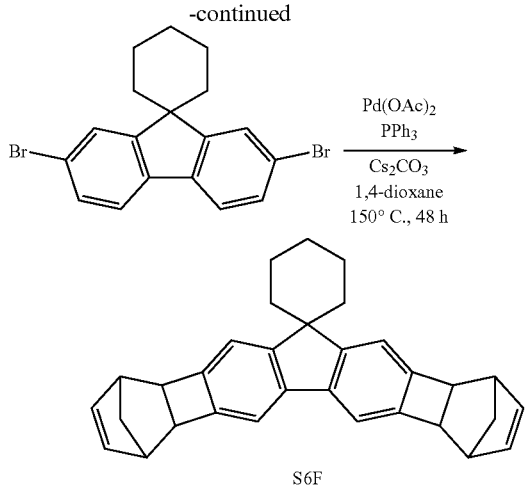

S6F

Reaction performed with 2.5 mmol of 2',7'-dibromo-spiro (cyclohexane-1,9'-fluorene). Purified by silica chromatography using mobile phase 19/1 hexanes/DCM to yield S6F as an off-white solid (490 mg, 47%). $^1$H NMR (600 MHz, CDCl$_3$) δ 7.45-7.43 (m, 2H), 7.38-7.37 (m, 2H), 6.26 (s, 4H), 3.18-3.17 (m, 4H), 2.84-2.82 (m, 4H), 7.96-1.88 (m, 4H), 1.79-1.68 (m, 6H), 1.32-1.28 (m, 2H), 0.99-0.96 (m, 2H); $^{13}$C NMR (150 MHz, CDCl$_3$): δ 152.53, 152.50, 144.39, 144.37, 144.32, 139.19, 139.15, 136.77, 136.75, 136.74, 136.72, 118.19, 118.13, 112.91, 112.89, 49.94, 49.40, 47.00, 16.98, 46.65, 41.84, 41.83, 41.76, 41.74, 41.52, 41.49, 36.60, 36.17, 35.75, 25.70, 22.8, 22.77, 22.71.
DHP.

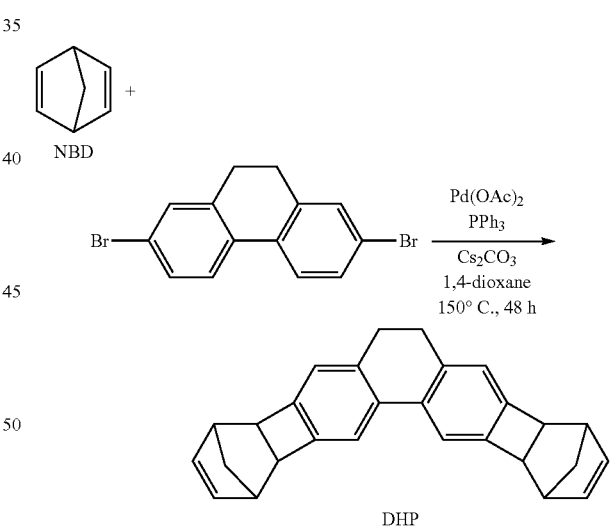

DHP

Reaction performed with 5.4 mmol of 2,7-dibromo-9,10-dihydrophenanthrene. Purified by silica chromatography using mobile phase 19/1 hexanes/DCM and then recrystallized in hexanes to yield DHP as an off-white solid (660 mg, 34%). $^1$H NMR (400 MHz, CDCl$_3$) δ 7.45-7.43 (m, 2H), 6.94-6.93 (m, 2H), 6.23 (s, 4H), 3.18-3.15 (m, 4H), 2.81-2.80 (m, 8H), 1.54-1.32 (m, 2H), 1.32-1.26 (m, 2H); $^{13}$C NMR (100 MHz, CDCl$_3$): δ 144.82, 144.72, 136.82, 136.75, 136.69, 136.67, 134.75, 121.44, 121.39, 117.44, 47.32, 47.27, 41.70, 41.47, 41.44, 30.26.

General Procedure for the Synthesis of CANAL Polymers. To a flame-dried glass pressure tube was added the dinorbornene (0.5 mmol), p-dibromo-p-xylene (132 mg, 0.5 mmol), Pd(OAc)$_2$ (2.2 mg, 0.01 mmol), and PPh$_3$ (5.2 mg, 0.02 mmol). The tube was transferred into a nitrogen-filled glovebox, and Cs$_2$CO$_3$ (326 mg, 1 mmol), butylated hydroxytoluene (1 mg), and THF (1 mL) was added. The tube was then sealed with a Teflon cap and taken out of the glovebox. After the mixture was stirred at 150° C. for 24 h, it was cooled to room temperature, 10 mL of CHCl$_3$ was added and the mixture was stirred at 70° C. for 30 mins. The mixture was then centrifuged and the supernatant was filtered through Celite, concentrated, and precipitated into ethyl acetate. The solid was dried in vacuum, dissolved in CHCl$_3$, and then precipitated in methanol to yield the polymer as an off-white solid.

CANAL-Me-DMF.

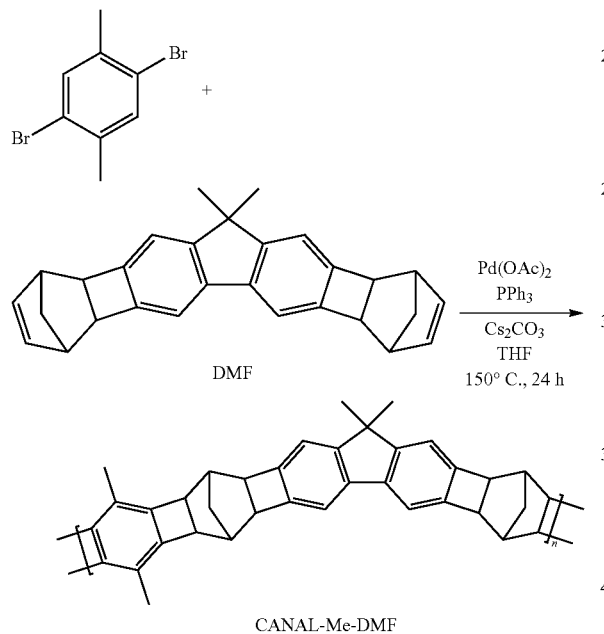

DMF

CANAL-Me-DMF

Off-white solid (200 mg, 76%). $^1$H NMR (400 MHz, CDCl$_3$) δ 7.29 (br, s, 2H), 7.01 (br, s, 2H), 3.24-3.13 (br, s, 8H), 2.34 (br, s, 4H), 2.02 (br, s, 6H), 1.39 (br, s, 6H), 0.71 (br, s, 4H). GPC MALLS M$_n$=48 kDa, M$_w$=99 kDa.

CANAL-Me-S5F.

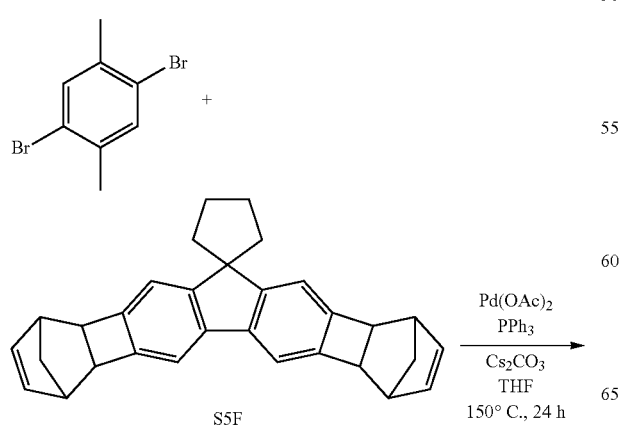

S5F

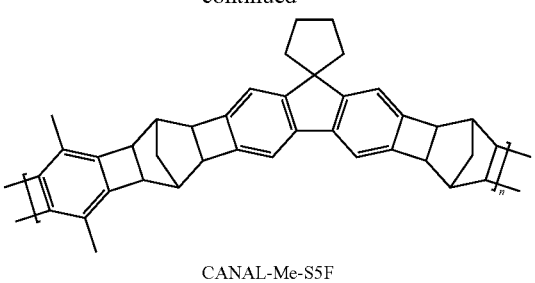

CANAL-Me-S5F

Off-white solid (230 mg, 100%). $^1$H NMR (400 MHz, CDCl$_3$) δ 7.26 (s, 2H), 7.00 (s, 2H), 3.23-3.12 (m, 8H), 2.34 (s, 4H), 2.02 (s, 14H), 0.72 (s, 4H). GPC MALLS M$_n$=38 kDa, M$_w$=100 kDa.

CANAL-Me-S6F.

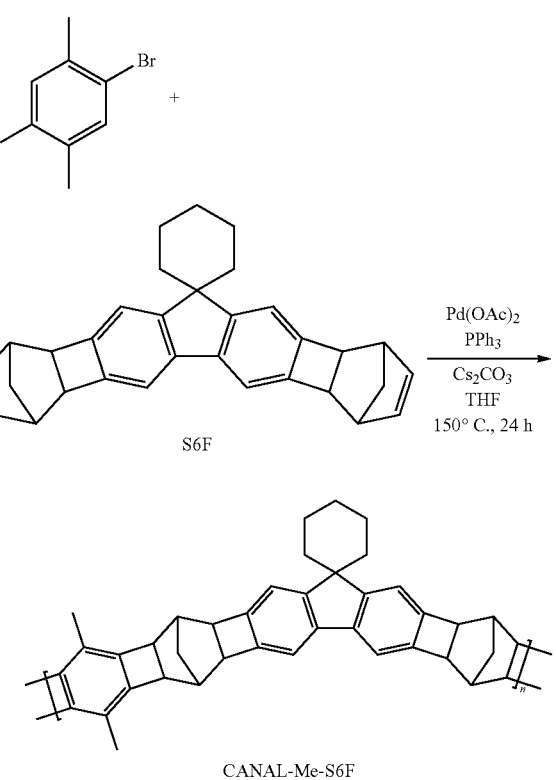

S6F

CANAL-Me-S6F

Off-white solid (170 mg, 70%). H NMR (400 MHz, CDCl$_3$) δ 7.32-7.22 (m, 4H), 3.25-3.13 (m, 8H), 2.33 (s, 4H), 2.02-1.64 (m, 16H), 0.72 (s, 4H). GPC MALLS M$_n$=23 kDa, M$_w$=67 kDa.

CANAL-Me-DHP.

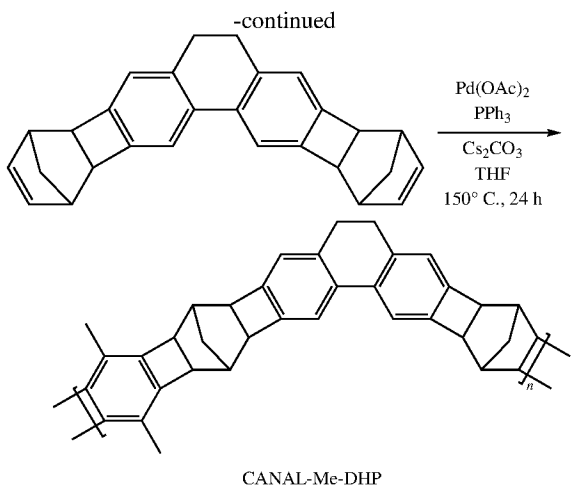

CANAL-Me-DHP

Reaction was performed with 0.36 mmol of monomers to yield CNAAL-Me-DHP as an off-white solid (100 mg, 68%). $^1$H NMR (500 MHz, CDCl$_3$) δ 7.30 (s, 2H), 6.81 (s, 2H), 3.26 (s, 4H), 3.12 (s, 4H), 2.75 (s, 4H), 2.33 (s, 4H), 2.02 (s, 6H), 0.80-0.72 (m, 4H). GPC MALLS $M_n$=75 kDa, $M_w$=170 kDa.

Polymer Film Formation. For a typical polymer casting, 100 mg of polymer was dissolved in 6 g of chloroform (—2 wt. % solution), and the solution was transferred into a flat, 5-cm Petri dish with a Norton® fluorinated ethylene propylene liner (WELCH Fluorocarbon, Inc.). The Petri dish was covered with a watch glass slow down the evaporation. The solvent evaporated in 1-2 days to form a flat film.

Pure-Gas Permeation Experiments and Analysis. Experiments were performed on a constant-volume variable-pressure apparatus at 35° C. and 1 bar upstream pressure, unless otherwise stated. Before permeation experiments, polymer films were wither heated at 120° C. under vacuum for 24 h or heated at 120° C. under vacuum for 24 h and then soaked in liquid methanol for 24 h. The films were then masked with epoxy on brass support and further degassed at 35° C. under high vacuum (<0.02 Torr) for 8 h in the permeation apparatus. Variable-temperature pure-gas permeation experiments were performed at 25, 35, 45, and 55° C.

The permeability, P, of gasses was determined using the following equation:

$$P = \frac{V_D l}{(p_2 - \overline{p_1})ART}\left[\left(\frac{dp_1}{dt}\right)_{ss} - \left(\frac{dp_1}{dt}\right)_{leak}\right], \quad (S1)$$

where $V_D$ is the downstream volume, l is the thickness of the polymer film, $p_2$ is the upstream pressure, $\overline{p_1}$ is the average downstream pressure calculated in the time interval considered, A is the exposed area of the membrane, and $\left(\frac{dp_1}{dt}\right)_{ss}$ and $\left(\frac{dp_1}{dt}\right)_{leak}$ are the change in downstream pressure at steady-state permeation and when the system is sealed, respectively. For even the least permeable gas, $N_2$, $\left(\frac{dp_1}{dt}\right)_{leak}$ was found to be 2 orders of magnitude lower than $\left(\frac{dp_1}{dt}\right)_{ss}.$ Ideal permselectivity (a) of gas pair A/B is defined as follows:

$$\alpha = P_A/P_B \quad (S2),$$

where $P_A$ and $P_B$ are the permeability coefficients of gases A and B, respectively. Ideal diffusivity and solubility selectivity of gas pair A/B are defined by eq. 5 and 6, respectively:

$$\alpha_D = D_A/D_B \quad (S3),$$

$$\alpha_S = S_A/S_B \quad (S4).$$

Figure 9:
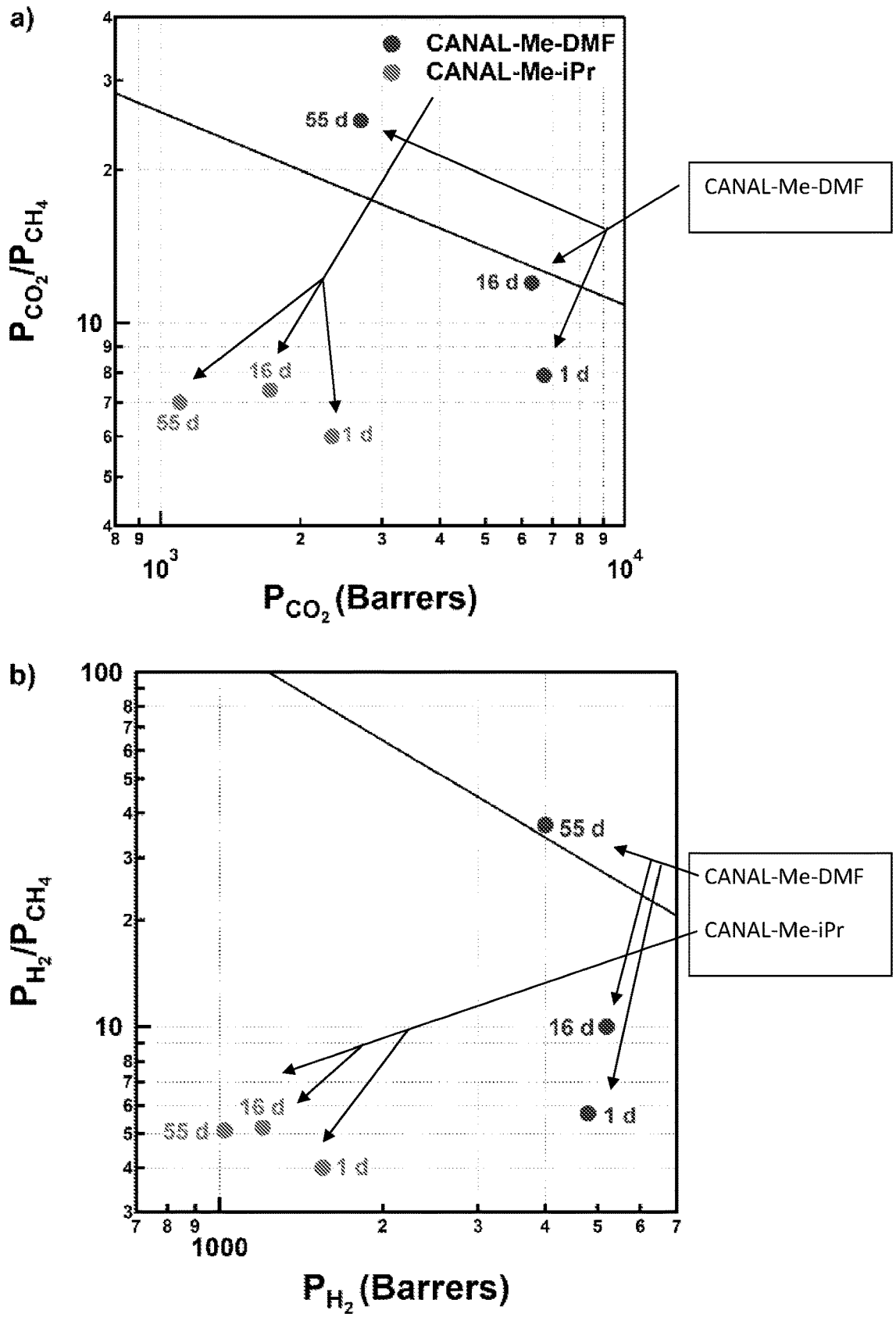
FIG. 9 shows pure-gas permeation properties of CANAL-Me-DMF and CANAL-Me-iPr relative to the 2008 $CO_2/CH_4$ (a) and 2015 $H_2/N_2$ (b) upper bounds. Film thickness=100 m.

After CANAL-Me-DMF films were cast from chloroform solutions, they were either heated to about 120° C. for about 24 h (FIG. 9) or treated in liquid methanol for about 24 h and then air dried (red circles, FIG. 6). After aging, CANAL-Me-DMF films exhibited high permeability for $H_2$, $CO_2$, and $O_2$, as well as exceptional permselectivity for $H_2/CH_4$, $H_2/N_2$, $O_2/N_2$, $H_2/CO_2$ and $CO_2/CH_4$ (Table 1). The combination of high permeability and permselectivity places CANAL-Me-DMF well above the 2008 Robeson upper bounds for $H_2/CO_2$ and $CO_2/CH_4$, and above the 2015 upper bounds for $H_2/CH_4$, $H_2/N_2$, and $O_2/N_2$ (FIG. 6).

Figure 5A:
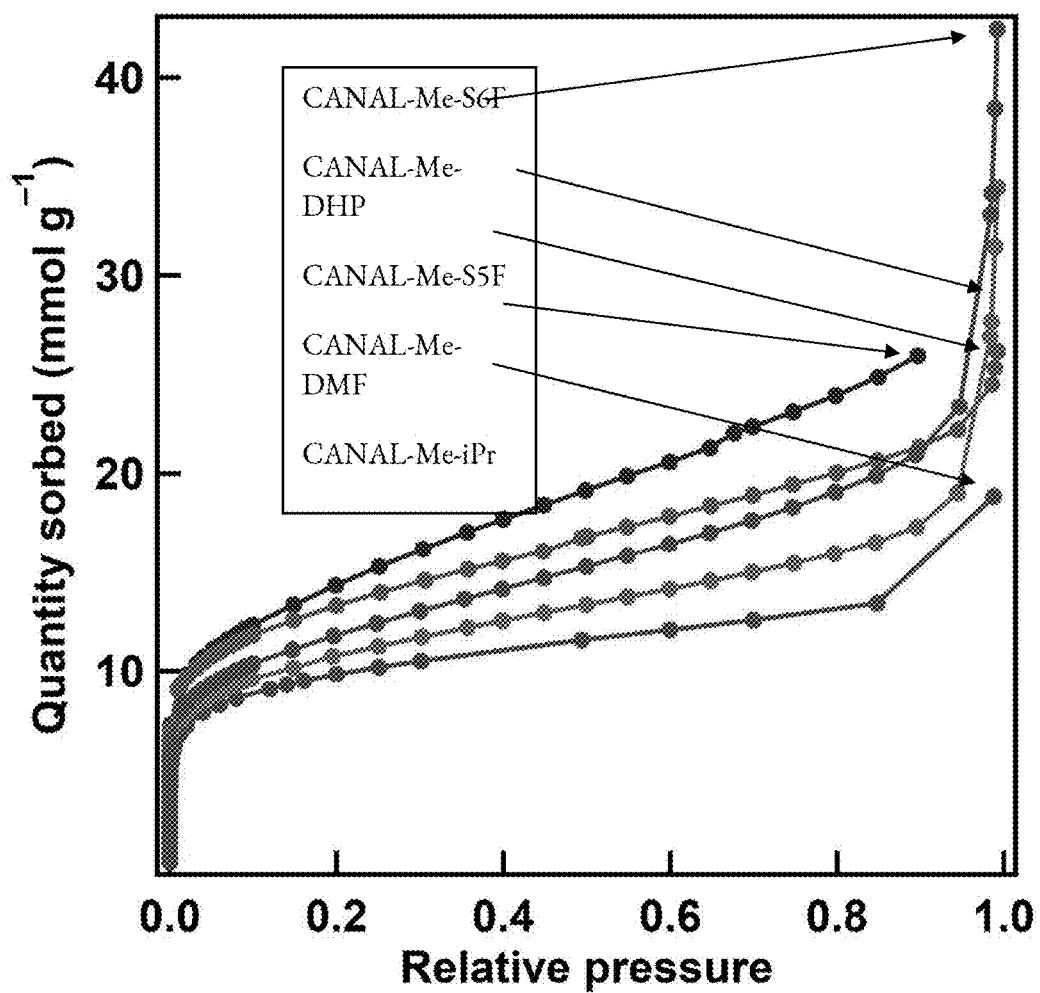
FIG. 5(a) shows $N_2$ sorption isotherms of CANAL-Me-DMF and CANAL-Me-iPr at 77 K.
Figure 5B:
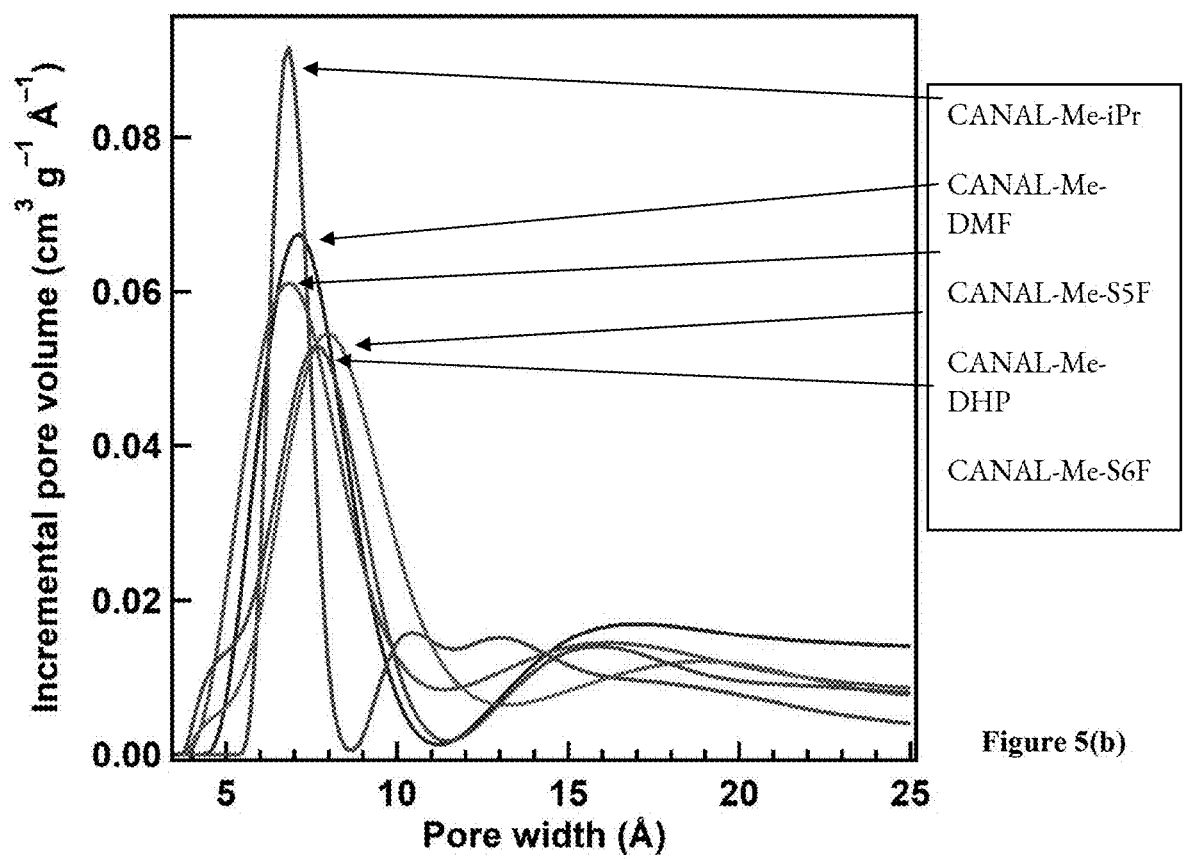
FIG. 5(b) shows pore size distributions derived from the $N_2$ sorption isotherms using the NLDFT carbon slit-shaped pore heterogeneous surface model.
Figure 5C:
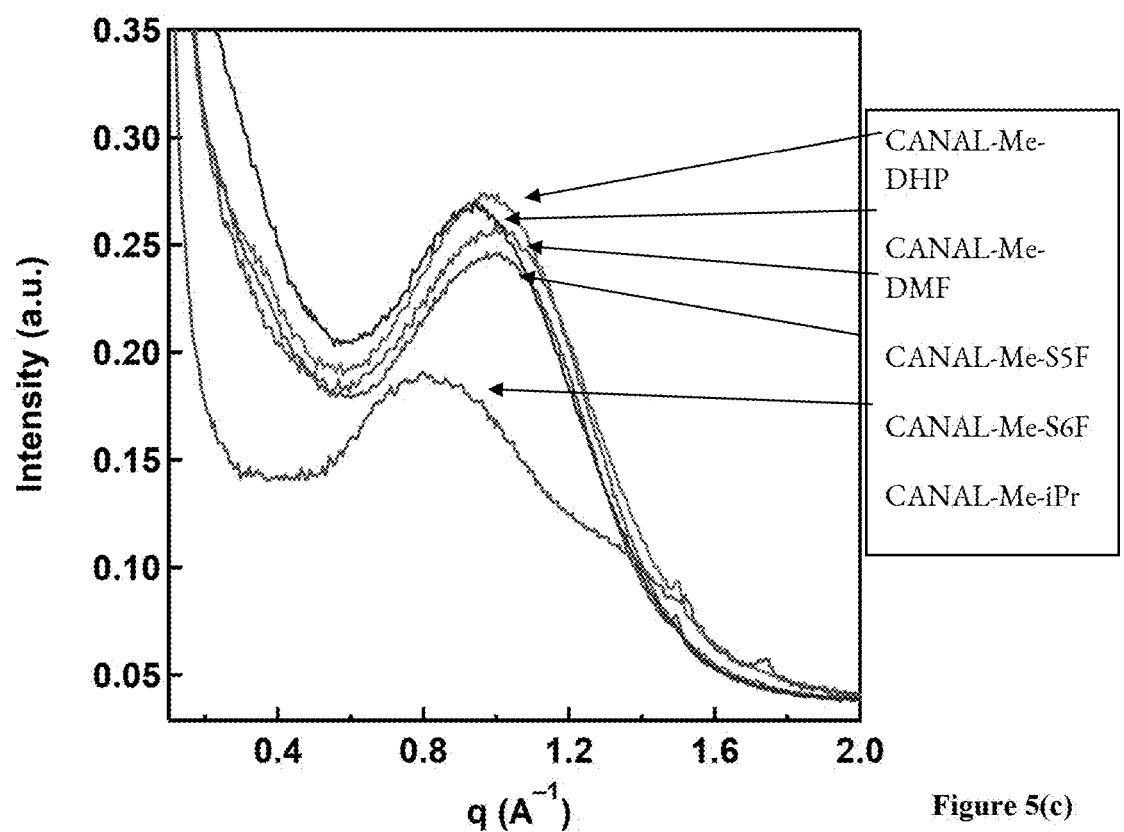
FIG. 5(c) shows wide-angle X-ray scattering of CANAL-Me-DMF, CANAL-Me-S5F, CANAL-Me-S6F, CANAL-Me-DHP, and CANAL-Me-iPr films.

These CANAL polymers all exhibited high BET surface areas as calculated using their nitrogen sorption isotherms. Interestingly, comparison of 3D CANAL polymer, such as CANAL-Me-DMF, and a representative 2D CANAL polymer, CANAL-Me-iPr, showed that while both polymers had the same BET surface area of 770 m$^2$ g$^{-1}$, CANAL-Me-DMF consistently gave greater $N_2$ sorption capacity at low pressure (p/p$_0$=10$^{-6}$-10$^{-2}$) (FIG. 5a inset), which led to a greater total ultra-micropore volume as derived using the nonlocal density functional theory (NLDFT) carbon slit-shaped pore heterogeneous surface model (FIG. 5b). Wide-angle X-ray scattering of these polymers showed a broad peak, typically observed for PIMs owing to the contrast between voids and polymer chains. The peak for CANAL-Me-DMF was shifted to higher q region relative to that of CANAL-Me-iPr, corresponding to a smaller average intersegmental distance of 6.4 Å vs 7.7 Å for CANAL-Me-iPr (FIG. 5c).

Figure 4:
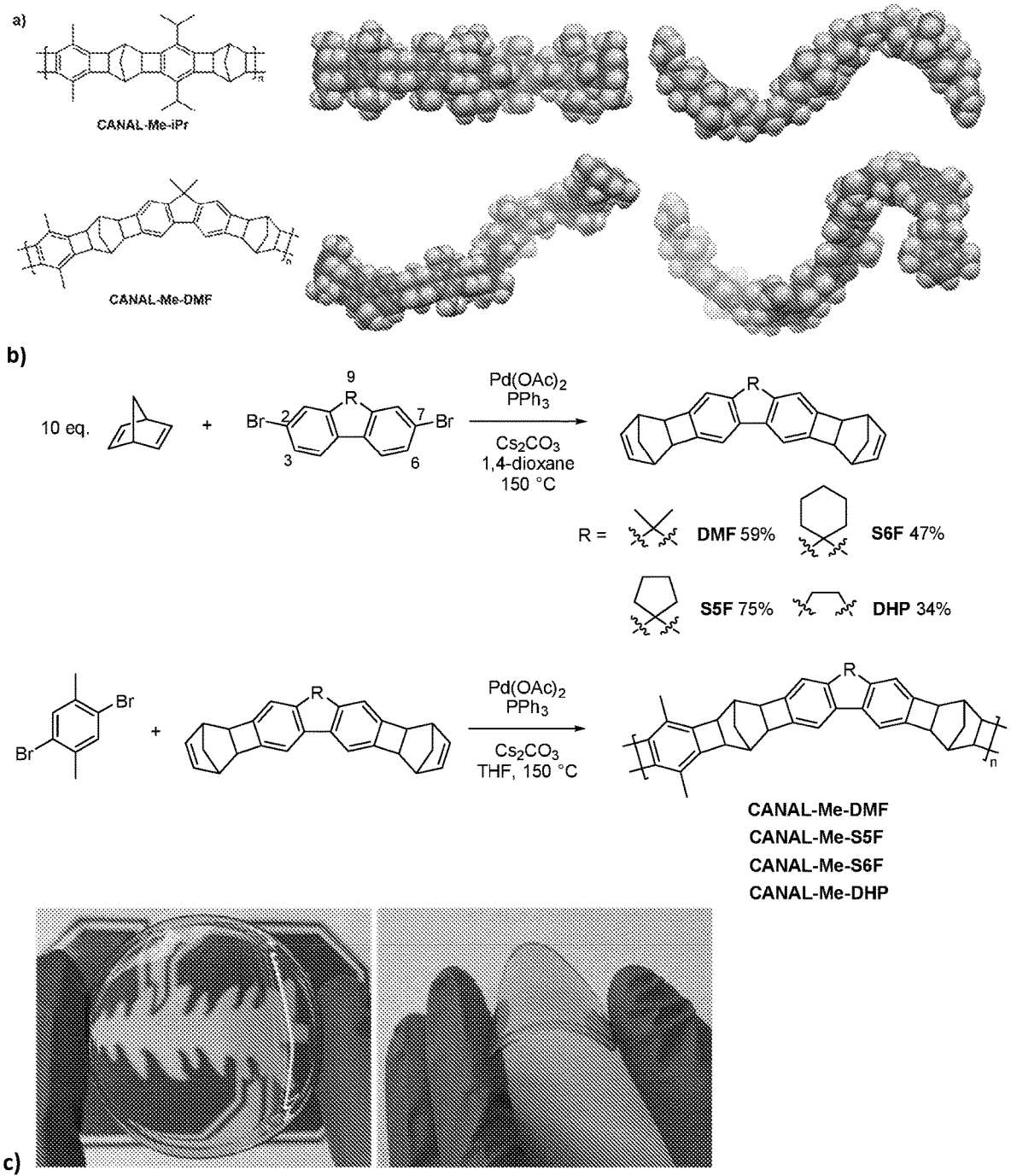
FIG. 4(a) shows simulated structures of a ribbon-like 2D polymer CANAL-Me-iPr (top) and a 3D polymer CANAL-Me-DMF (bottom).
FIG. 4(b) shows synthesis of 3D CANAL-fluorene and dihydrophenanthrene polymers.
FIG. 4(c) shows pictures of a 50-μm CANAL-Me-DMF film.
Figure 11:
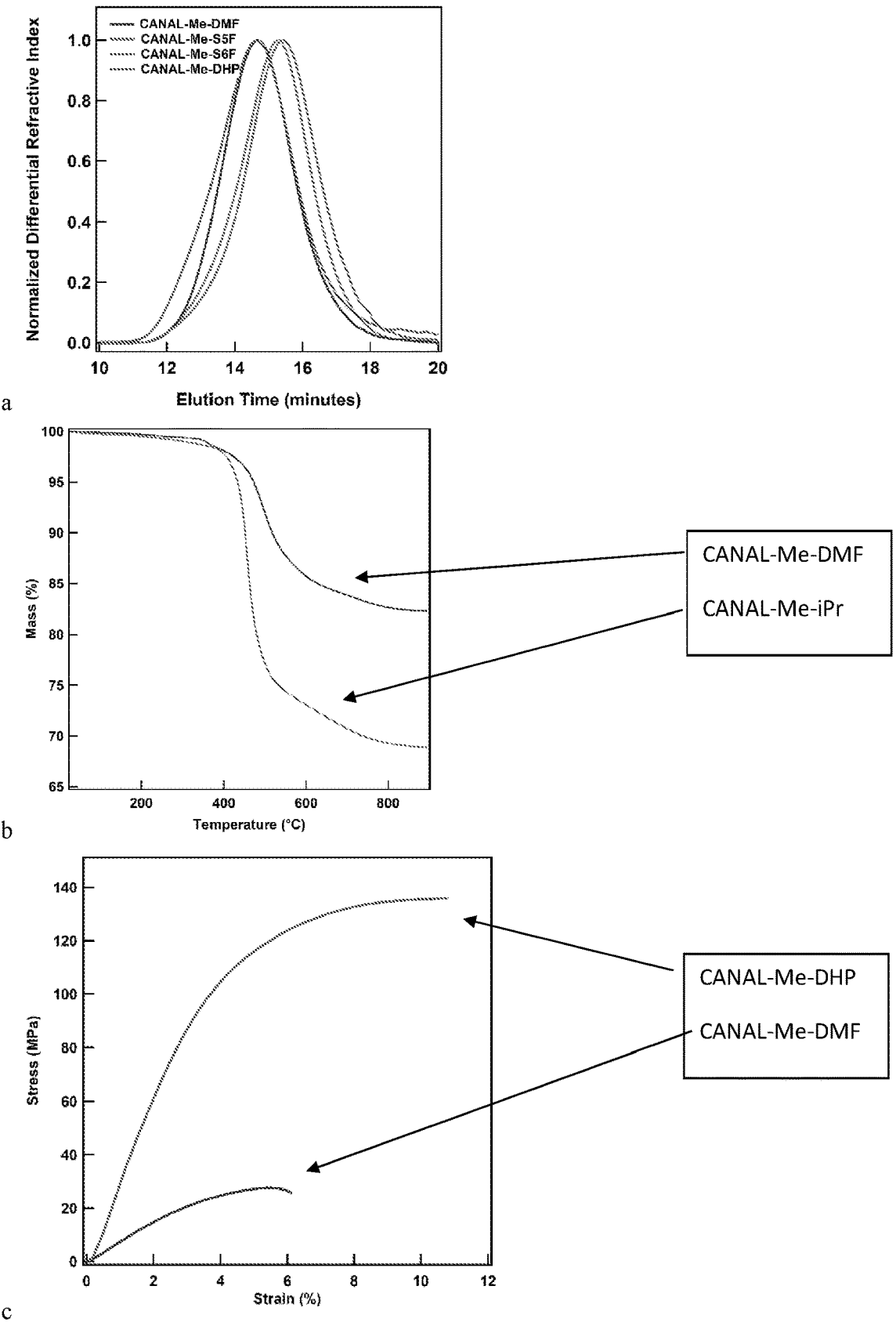
FIG. 11a shows GPC traces of CANAL polymers.
FIG. 11b shows TGA traces of CANAL-Me-iPr and CANAL-Me-DMF.
FIG. 11c shows tensile properties of CANAL-Me-DMF and CANAL-Me-DHP.

Films of CANAL-fluorene and CANAL-DHP polymers are mechanically robust and showed no damage after repeated bending and twisting (FIG. 4c). In contrast, films of 2D CANAL polymers are significantly more fragile, despite their higher MWs. CANAL-Me-DMF and CANAL-Me-DHP exhibited Young's modulus of 0.72 GPa and 3.1 GPa as well as elongation at break of 6% and 11%, respectively (FIG. 11c). The 3D CANAL polymers are thermally stable up to at least 350° C. without detectable glass transition (FIG. 11b). 50-60 m thick films of all the polymers can be easily prepared by casting from their chloroform solutions. After the films were pretreated using common conditions for PIMs (heating in vacuo at 120° C. for 24 h, then soaking in methanol, then air dried) to remove any residual casting solvent and erase any history, we performed pure-gas permeation experiments using gases in this order: Ar, $H_2$, $CH_4$, $N_2$, $O_2$, and $CO_2$ (T=35° C., p=1 bar). Fresh films of CANAL-Me-DMF exhibited high permeabilities but only moderate selectivities (Table 1). Surprisingly, upon aging, separation performance of CANAL-Me-DMF improved dramatically. Physical aging is commonly observed for PIMs, and is a process that reduces microporosity as the polymer chains adopt more compact packing. Aging of PIMs typically leads to significantly decreased permeability and moderately increased selectivity, moving the performance parallel to or to the left of the upper bound. Remarkably, aging of CANAL-Me-DMF clearly moved its performance above the state-of-the-art upper bounds for several industrially important gas pairs such as $H_2/CH_4$, $H_2/N_2$, $O_2/N_2$, and $CO_2/CH_4$ (FIG. 6, Table 1).

Figure 6A:
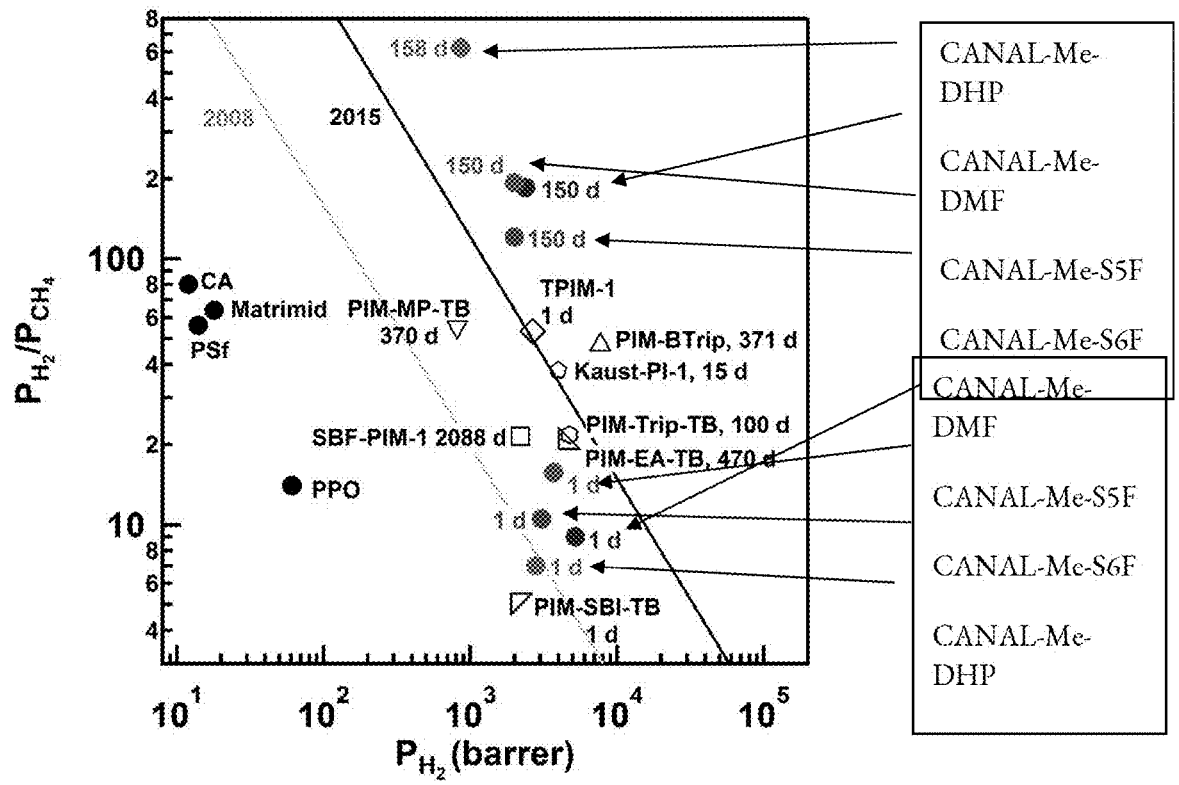
FIG. 6 shows pure-gas permeation properties of CANAL-Me-DMF, CANAL-Me-S5F, CANAL-Me-S6F, and CANAL-Me-DHP relative to the 2015 $H_2/CH_4$ (a), 2008 $CO_2/CH_4$ (b), 2015 $H_2/N_2$ (c), and 2015 $O_2/N_4$ (d) upper bounds. The state-of-the-art PIMs are plotted for their performance after aging (noted duration of aging in days). Film thickness and test condition of CANAL polymers: 50-60 m; T=35° C., p=1 bar.
Figure 6B:
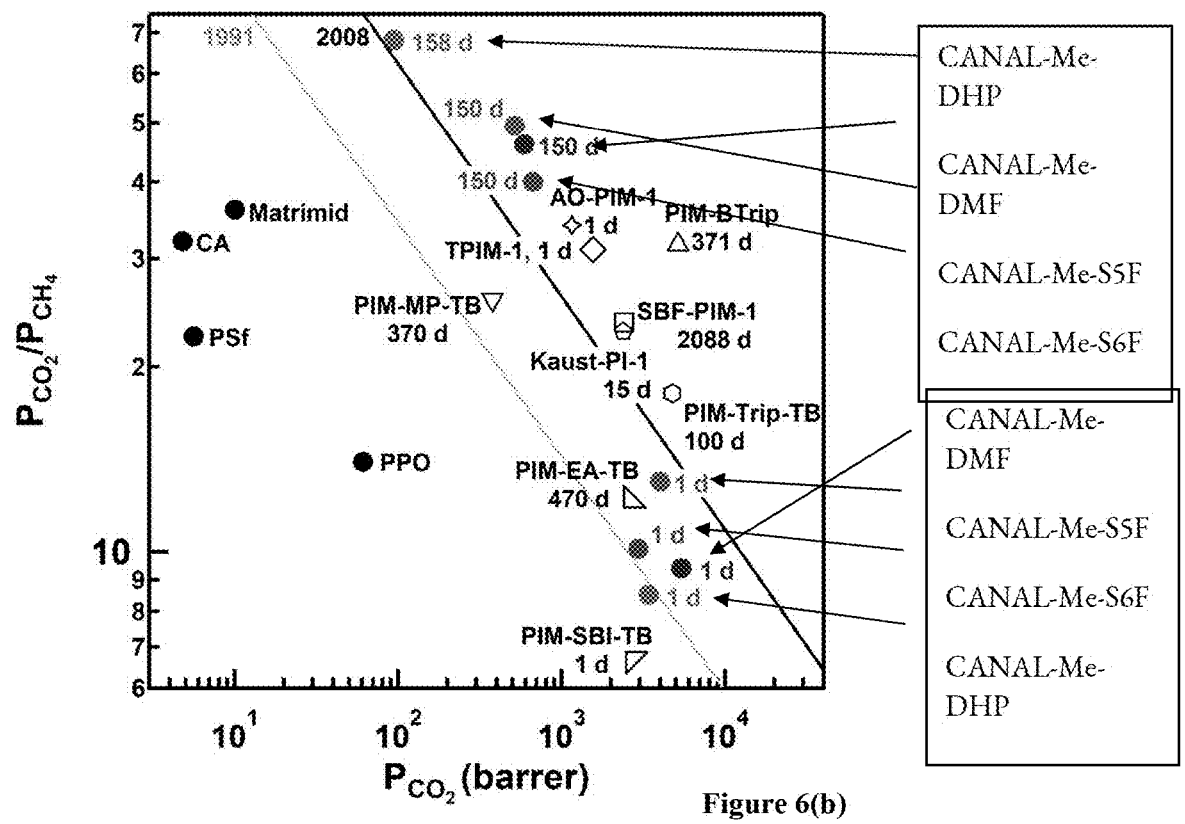
Figure 6C:
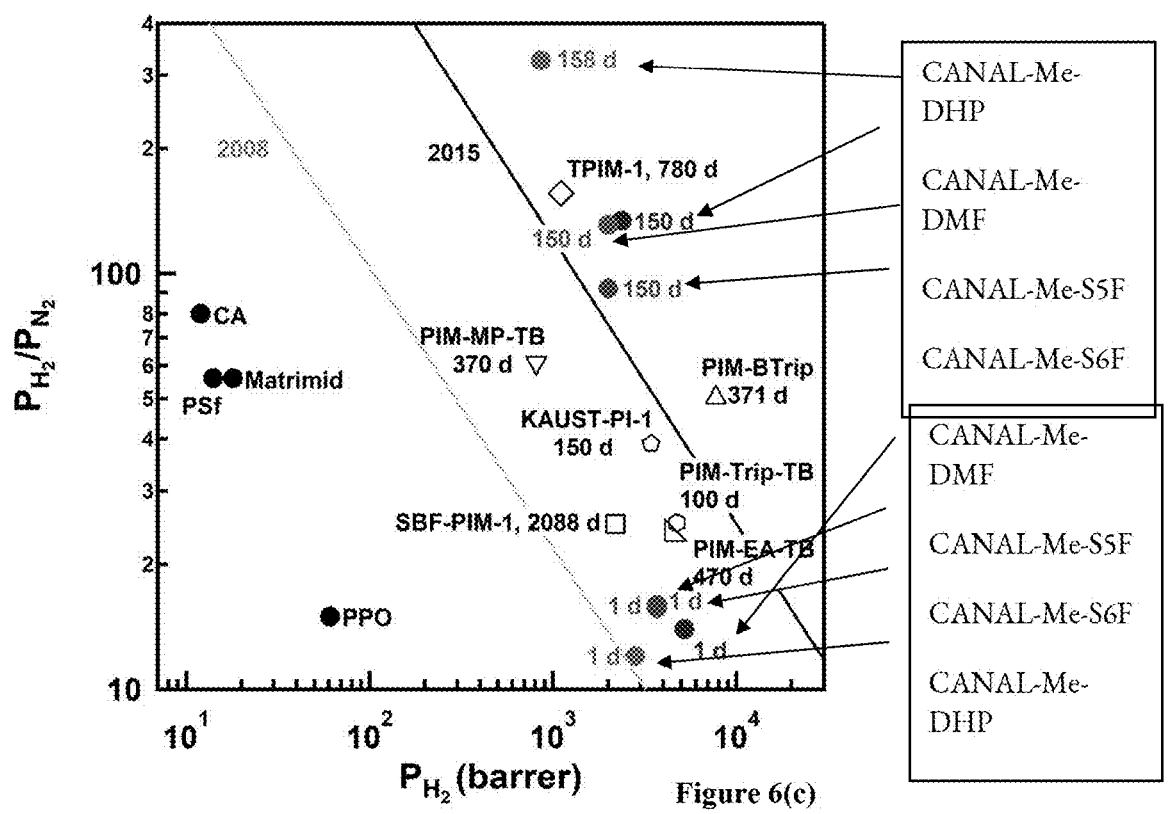
Figure 6D:
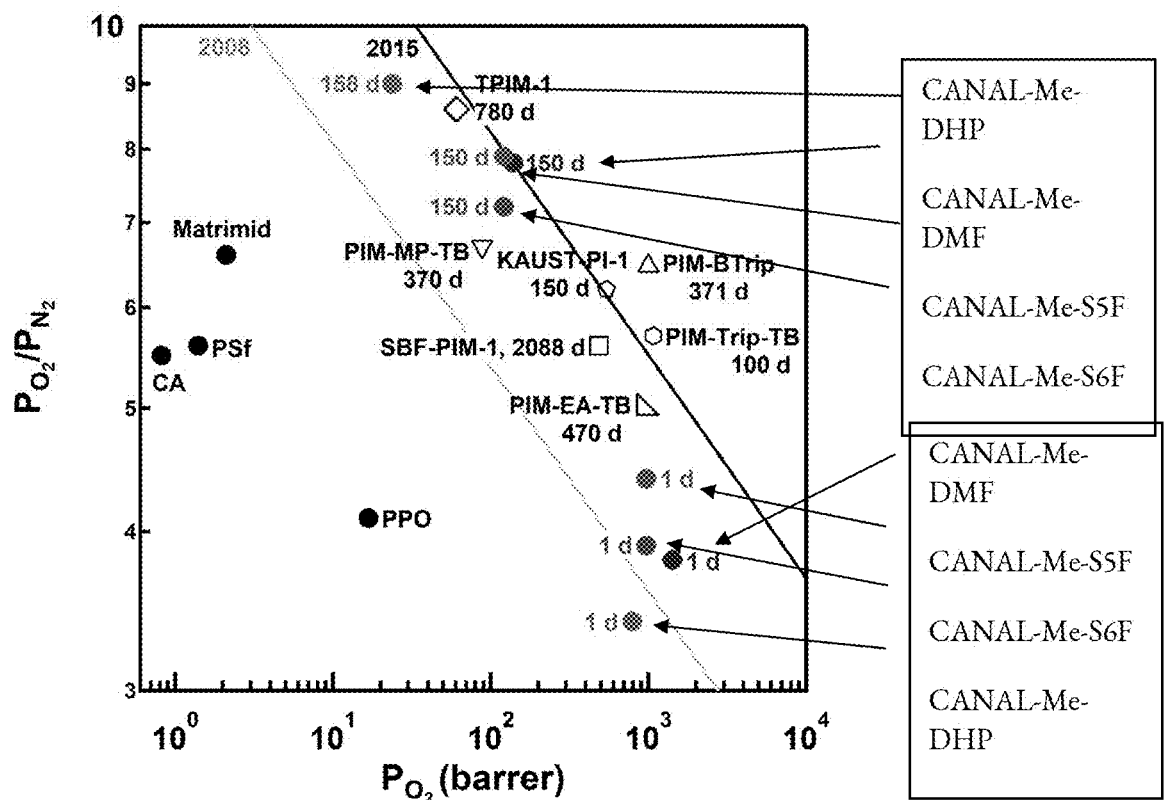

Compared to a commonly used membrane polymer for $H_2/CH_4$ separations, polysulfone (PSF), CANAL-Me-DMF is two orders of magnitude more permeable and three times more selective. For $CO_2/CH_4$ separation, CANAL-Me-DMF offers twice the selectivity and 100 times the permeability when compared to the widely used commercial membrane cellulose acetate (CA). With $H_2$ permeability >2000 barrer and $H_2/CH_4$ selectivity reaching almost 200, the $H_2/CH_4$ separation performance of aged CANAL-Me-DMF is also far above any other PIMs (FIG. 6a), which typically have $H_2/CH_4$ selectivity <50. Compared to PIM-BTrip, a PIM consisting of benzotriptycene and benzodioxane units with performance above the 2015 $H_2/CH_4$ upper bound, CANAL-Me-DMF is almost four times more selective for $H_2/CH_4$ (Table 1, FIG. 6a). Aged CANAL-Me-DMF also exhibited exceptional $CO_2/CH_4$ selectivity of ~50 and high $CO_2$ permeability of ~600 barrer. The $CO_2/CH_4$ selectivity of aged CANAL-Me-DMF is ~50% higher than that of the state-of-the-art PIM-BTrip (FIG. 6a). Most importantly, CANAL-Me-DMF meets the minimum $CO_2/CH_4$ selectivity of 40 recommended for natural gas purification application while maintaining high permeability in the hundreds of barrer.

Figure 7:
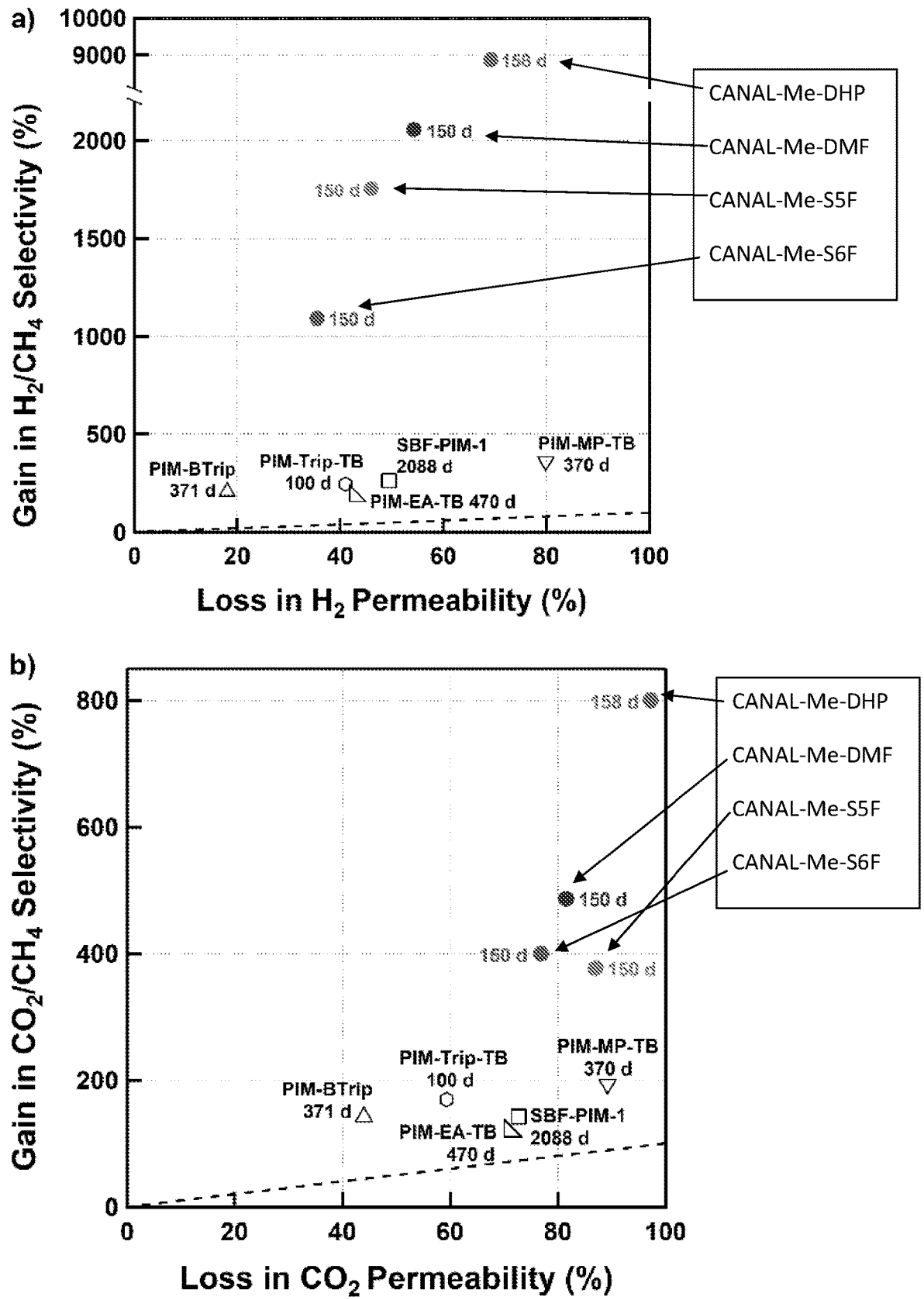
FIG. 7(a) shows loss in $H_2$ permeability and FIG. 7(b) shows loss in $CO_2$ permeability from aging trends for CANAL-Me-DMF, CANAL-Me-S5F, CANAL-Me-S6F, CANAL-Me-DHP, and some recently reported ladder PIMs. Dashed line indicates when the percentage of gain in selectivity is equal to the percentage of loss in permeability.

Interestingly, the CANAL-fluorene polymers with cyclic substituents, CANAL-Me-S5F and CANAL-Me-S6F, and CANAL-Me-DHP all showed ultrahigh performance upon aging, similar to that of CANAL-Me-DMF (FIG. 6-7). Compared to the CANAL-fluorene polymers, CANAL-Me-DHP became more selective, reaching $CO_2/CH_4$ and $H_2/CH_4$ selectivity of 68 and 621, respectively, while still maintaining high $CO_2$ and $H_2$ permeability of 94 and 860 barrer, respectively, after 158 days (Table 1). Plotting gain in selectivity vs loss in permeability after aging provides direct visualization of aging profiles among different PIMs (FIG. 7). 3D CANAL polymers stood out in favorable aging trends from other recently reported PIMs. While the moderate loss of permeability for 3D CANAL polymers is in the range of what was observed for other recent PIMs, the gain in selectivity for 3D CANAL polymers is much higher. For instance, the $H_2/CH_4$ selectivity for CANAL-Me-DMF increased >20 times upon aging, in comparison to <3 times increase for SBF-PIM-1 (FIG. 7a), which consists of spirobifluorene and dibenzodioxane units, while their loss in $H_2$ permeability was similar. For $CO_2/CH_4$, the selectivity of CANAL-fluorene polymers increased 4-5 times upon aging, compared to <2 times increase for other state-of-the-art PIMs (FIG. 7b). Considering the nonpolar hydrocarbon structures of 3D CANAL polymers and thus the absence of polar gas-polymer interactions, the ultrahigh selectivity of the polymers can be attributed to their exceptional size-sieving capability.

TABLE 1

Gas permeability and ideal permselectivity of CANAL polymers (T = 35° C.; p = 1 bar) and PIM-BTrip (T = 25° C.; p = 1 bar).

| Polymer (aging time, thickness) | Permeability (barrer) | | | | | Ideal Permselectivity | | | |
| --- | --- | --- | --- | --- | --- | --- | --- | --- | --- |
| | $H_2$ | $N_2$ | $O_2$ | $CH_4$ | $CO_2$ | $H_2/N_2$ | $H_2/CH_4$ | $O_2/N_2$ | $CO_2/CH_4$ |
| CANAL-Me—DMF (1 d, 50 μm)[a] | 5200 ± 200 | 370 ± 10 | 1420 ± 50 | 570 ± 20 | 5400 ± 200 | 14 | 9.0 | 3.8 | 9.4 |
| CANAL-Me—DMF (150 d, 50 μm)[a] | 2380 ± 90 | 18 ± 1 | 139 ± 6 | 13 ± 1 | 590 ± 20 | 134 | 185 | 7.8 | 46 |
| CANAL-Me-S5F (1 d, 50 μm)[a] | 3700 ± 100 | 220 ± 8 | 970 ± 30 | 320 ± 10 | 4000 ± 100 | 16 | 11 | 4.4 | 13 |
| CANAL-Me-S5F (150 d, 50 μm)[a] | 2000 ± 80 | 15.3 ± 0.6 | 121 ± 5 | 10 ± 1 | 520 ± 20 | 131 | 193 | 7.9 | 49 |
| CANAL-Me-S6F (1 d, 50 μm)[a] | 3100 ± 100 | 187 ± 7 | 730 ± 30 | 290 ± 10 | 2900 ± 100 | 16 | 11 | 3.9 | 10 |
| CANAL-Me-S6F (150 d, 50 μm)[a] | 2000 ± 80 | 21.8 ± 0.9 | 156 ± 6 | 17 ± 1 | 670 ± 30 | 92 | 120 | 7.2 | 40 |
| CANAL-Me-DHP (1 d, 50 μm)[a] | 2800 ± 100 | 234 ± 9 | 790 ± 30 | 400 ± 20 | 3400 ± 100 | 12 | 7 | 3.4 | 8.5 |
| CANAL-Me-DHP (158 d, 50 μm)[a] | 860 ± 30 | 2.6 ± .1 | 23.8 ± 0.9 | 1.4 ± .1 | 94 ± 3 | 326 | 621 | 9.0 | 68 |
| PIM-BTrip (1 d, 64 μm)[b] | 9430 | 339 | 1800 | 412 | 9200 | 28 | 23 | 5.3 | 22 |
| PIM-BTrip (371 d, 64 μm)[b] | 7730 | 154 | 997 | 163 | 5150 | 50 | 47 | 6.5 | 32 |

[a]Polymer film was heated at 120° C. in a vacuum oven for 24 h, soaked in methanol for 24 h, and then air dried for 24 h.
[b]Polymer film was soaked in methanol.

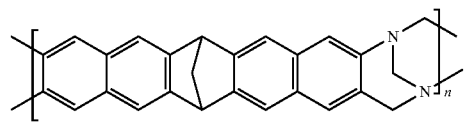

PIM-MP-TB

TABLE 1-continued

Gas permeability and ideal permselectivity of CANAL polymers (T = 35° C.; p = 1 bar) and PIM-BTrip (T = 25° C.; p = 1 bar).

| Polymer (aging time, thickness) | Permeability (barrer) | | | | | Ideal Permselectivity | | | |
|---|---|---|---|---|---|---|---|---|---|
| | $H_2$ | $N_2$ | $O_2$ | $CH_4$ | $CO_2$ | $H_2/N_2$ | $H_2/CH_4$ | $O_2/N_2$ | $CO_2/CH_4$ |

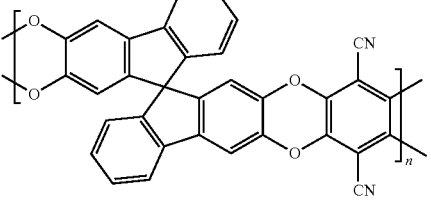

SBF-PIM-1

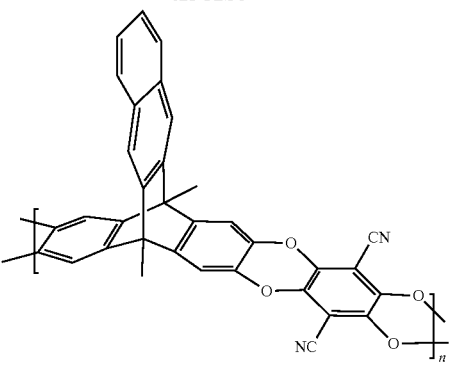

PIM-BTrip

The exceptional gas separation performance of CANAL-Me-DMF is further demonstrated by $CO_2/CH_4$ mixed-gas permeation experiments. First evaluated was the $CO_2/CH_4$ mixed-gas permeation properties of CANAL-Me-DMF with 20-80% $CO_2$ at 2 bar total pressure (FIG. 8a, opened circles). For all three compositions, the selectivity remained at 49, compared to the ideal selectivity of 44 determined by pure-gas experiments. The higher mixed-gas selectivity is likely due to competitive sorption effects and suggests that there is no significant plasticization at <2 bar $CO_2$ partial pressure. The decrease in $CO_2$ permeability with increasing $CO_2$ partial pressure can be explained by the dual-mode sorption model, which predicts that the solubility of gases in glassy polymers will decrease with increasing pressure. We then evaluated the mixed-gas permeation properties of CANAL-Me-DMF in 50/50 $CO_2/CH_4$ at variable pressure. As $CO_2$ partial pressure increased from 1 to 14 bar, the permeability of both $CO_2$ and $CH_4$ initially decreased and then both increased at $CO_2$ partial pressure >8 bar (FIG. 8b). The initial decrease in permeability is due to a combination of dual-mode and competitive sorption effects, both of which decrease the solubility of $CO_2$ and $CH_4$. As pressure continues to increase however, plasticization, which increases the diffusivity of both gases, outweighs both the dual-mode and competitive sorption effects, leading to increased $CO_2$ and $CH_4$ permeability as well as decreased mixed-gas selectivity. Despite plasticization, the $CO_2/CH_4$ mixed-gas selectivity remains >35 even at 14 bar $CO_2$ partial pressure, placing the mixed-gas performance of CANAL-Me-DMF far above the 2018 mixed-gas upper bound and even above the 2008 pure-gas upper bound. The unprecedented performance of CANAL-Me-DMF for $CO_2/CH_4$ separation makes it particularly attractive for natural gas sweetening.

Figure 10:
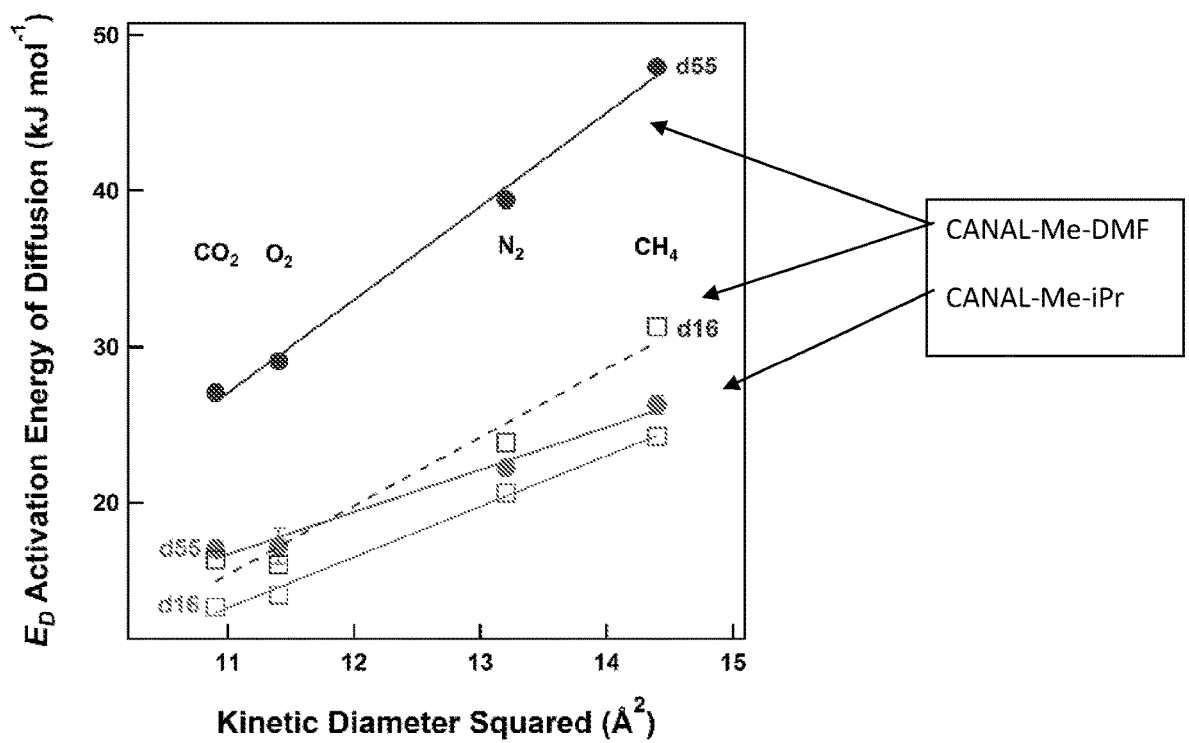
FIG. 10 shows Activation energy of diffusion for gases in CANAL-Me-iPr and CANAL-Me-DMF after 16 (open squared) and 55 days of aging (filled circles).

The same aging trend and greatly enhanced performance was not observed from previously reported 2D CANAL polymers, suggesting a striking effect of ladder chain conformations on aging and separation performance. CANAL-Me-iPr showed little or no gain in selectivity but decreased permeability upon aging (Table 2, FIG. 9). For instance, $H_2/CH_4$ selectivity of CANAL-Me-iPr increased only 25% after 55 days, while its $H_2$ permeability decreased by 35%. In contrast, CANAL-Me-DMF exhibited 650% increase in $H_2/CH_4$ selectivity and only ~$_{17}$% decrease in $H_2$ permeability after the same period of aging. The dramatically different aging profiles between 3D and 2D CANAL polymers prompted us to investigate the origin of improved selectivities for CANAL-Me-DMF. We determined diffusion (D) and solubility (S) coefficients based on the solution-diffusion model (PDS). As CANAL-Me-DMF aged, solubility coefficients remained relatively constant, but diffusion coefficients of larger gases, such as $N_2$ and $CH_4$, decreased much faster than those of smaller gases, such as $CO_2$ and $O_2$. For example, after 55 days of aging, the diffusion coefficient of $CH_4$ decreased ~90%, while that of 02 decreased by ~63% (Table 3). The constant solubility coefficients over aging suggests that the total free volume of polymers remained constant. But the large decrease in diffusion coefficients for larger gases over time suggests that the connections between free volume elements, or "bottlenecks" in transport, are narrowing as aging occurs. In particular, the results demonstrate that these "bottlenecks" are collapsing in such a way to slow down the transport of large gasses (larger than $N_2$ with a kinetic diameter of 3.64 Å) without affecting much the transport of small gases (smaller than 02 with a kinetic diameter of 3.46 Å), leading to enhanced size selectivity as a result of aging. In contrast, for CANAL-Me-iPr, permeabilities for all gases decreased by roughly the same relative extent, leading to small changes in selectivity (Table 2).

types of CANAL polymers are hydrocarbons with no specific polar interactions with gases, the higher activation energies suggest narrower diffusion "bottlenecks" in CANAL-Me-DMF than in CANAL-Me-iPr. The slope of the best-fit line in FIG. 10 is the energetic selectivity, which is 6.0 and 2.7 kJ mol$^{-1}$ Å$^{-2}$ for CANAL-Me-DMF and CANAL-Me-iPr, respectively. Furthermore, comparison of

TABLE 2

Gas Permeability and Ideal permselectivity of CANAL-Me—DMF and CANAL-Me-iPr (T = 35° C.; p = 1 bar).

| Polymer | Permeability (barrer) | | | | | Ideal Permselectivity | | | |
|---|---|---|---|---|---|---|---|---|---|
| (aging time in days) | $H_2$ | $N_2$ | $O_2$ | $CH_4$ | $CO_2$ | $H_2/N_2$ | $H_2/CH_4$ | $O_2/N_2$ | $CO_2/CH_4$ |
| CANAL-Me—DMF (1)[a] | 4800 ± 200 | 500 ± 20 | 1600 ± 60 | 840 ± 30 | 6700 ± 200 | 9.6 | 5.7 | 3.3 | 7.9 |
| CANAL-Me—DMF (16)[a] | 5200 ± 200 | 380 ± 10 | 1500 ± 50 | 510 ± 20 | 6300 ± 200 | 14 | 10 | 3.9 | 12 |
| CANAL-Me—DMF (55)[a] | 4000 ± 100 | 114 ± 4 | 650 ± 20 | 109 ± 4 | 2700 ± 90 | 35 | 37 | 5.7 | 25 |
| CANAL-Me-iPr (1)[b] | 1550 ± 50 | 181 ± 6 | 500 ± 20 | 390 ± 10 | 2340 ± 80 | 8.6 | 4.0 | 2.8 | 6.0 |
| CANAL-Me-iPr (16)[b] | 1200 ± 40 | 126 ± 4 | 360 ± 10 | 233 ± 8 | 1720 ± 60 | 9.5 | 5.2 | 2.9 | 7.4 |
| CANAL-Me-iPr (55) | 950 ± 30 | 94 ± 3 | 270 ± 10 | 180 ± 6 | 1260 ± 40 | 10.1 | 5.3 | 2.9 | 7 |

[a]Polymer film was heated at 120° C. in a vacuum oven for 24 h.
[b]Data from *Macromolecules* 2019, 52 (16), 6294-6302.

TABLE 3

Diffusion and solubility coefficients of CANAL-Me—DMF and CANAL-Me-iPr.
Temperature = 35° C., upstream pressure = 15 psi.

| Polymer | Diffusion Coefficients ($10^{-7}$ cm$^{-2}$ s$^{-1}$) | | | | Solubility Coefficients (cm$^3_{STP}$ cm$^{-3}_{pol}$) | | | |
|---|---|---|---|---|---|---|---|---|
| (aging time, days) | $N_2$ | $O_2$ | $CH_4$ | $CO_2$ | $N_2$ | $O_2$ | $CH_4$ | $CO_2$ |
| CANAL-Me—DMF (1)[a] | 14 ± 1 | 41 ± 8 | 6.2 ± 0.2 | 31 ± 5 | 2.7 ± 0.2 | 3.0 ± 0.6 | 10.2 ± 0.5 | 20 ± 3 |
| CANAL-Me—DMF (16)[a] | 9.1 ± 0.5 | 35 ± 7 | 3.18 ± 0.07 | 26 ± 3 | 3.2 ± 0.2 | 3.2 ± 0.6 | 12.1 ± 0.5 | 23 ± 3 |
| CANAL-Me—DMF (55)[a] | 2.7 ± 0.1 | 15 ± 1 | 0.68 ± 0.01 | 8.0 ± 0.3 | 3.2 ± 0.1 | 3.2 ± 0.3 | 12.1 ± 0.5 | 26 ± 1 |
| CANAL-Me-iPr (1)[b] | 13 ± 4 | 25 ± 4 | 7.8 ± 0.7 | 18.8 ± 0.9 | 1.7 ± 0.1 | 2.3 ± 0.2 | 7.2 ± 0.4 | 19 ± 1 |
| CANAL-Me-iPr (16)[b] | 6.7 ± 0.2 | 16 ± 1 | 3.32 ± 0.04 | 9.2 ± 0.3 | 1.4 ± 0.1 | 1.7 ± 0.1 | 5.3 ± 0.2 | 14 ± 1 |
| CANAL-Me-iPr (55) | 5.3 ± 0.2 | 12 ± 1 | 2.34 ± 0.05 | 6.5 ± 0.2 | 1.3 | 1.7 | 5.8 | 15 |

[a]Polymer film was heated at 120° C. in a vacuum oven for 24 h.
[b]Data from *Macromolecules* 2019, 52 (16), 6294-6302.

Variable-temperature pure-gas permeation experiments were performed. Activation energies of diffusion were calculated using the Arrhenius equation for both CANAL-Me-DMF and CANAL-Me-iPr after aging, and are plotted as a function of gas kinetic diameter squared (FIG. 10). CANAL-Me-DMF exhibited higher activation energies of diffusion for all four gases tested, $CO_2$, $O_2$, $N_2$, and $CH_4$. Since both fresh and aged CANAL-Me-DMF revealed increased slope for the aged membrane (FIG. 10). The larger slope of size-dependent diffusion barriers for aged CANAL-Me-DMF accounts for its dramatically enhanced selectivity.

Additional data for the CANAL-Me-DMF is provided below.

TABLE 4

Gas Permeability and Ideal permselectivity of CANAL-Me—DMF
(T = about 35° C.; p = about 1 bar; film thickness = about 130 μm).

| Polymer | Permeability (barrier) | | | | | Ideal Permselectivity | | | |
|---|---|---|---|---|---|---|---|---|---|
| History | $H_2$ | $N_2$ | $O_2$ | $CH_4$ | $CO_2$ | $H_2/N_2$ | $H_2/CH_4$ | $O_2/N_2$ | $CO_2/CH_4$ |
| Fresh[a, b, c] | 5700 | 723 | 2100 | 1390 | 8800 | 7.9 | 4.5 | 2.9 | 6.8 |
| Aged 64 days[a] | 3500 | 36 | 270 | 22 | 1190 | 99 | 159 | 7.5 | 54 |
| Fresh[b, d, e] | 3500 | 380 | 1200 | 710 | 5100 | 9.1 | 4.9 | 3.0 | 7.2 |
| Aged 17 days[d] | 3100 | 186 | 780 | 210 | 3600 | 17 | 15 | 4.2 | 17 |
| Aged 37 days[d] | 2900 | 101 | 530 | 91 | 2430 | 28 | 32 | 5.2 | 27 |

TABLE 4-continued

Gas Permeability and Ideal permselectivity of CANAL-Me—DMF
(T = about 35° C.; p = about 1 bar; film thickness = about 130 μm).

| Polymer | Permeability (barrier) | | | | | Ideal Permselectivity | | | |
|---|---|---|---|---|---|---|---|---|---|
| History | $H_2$ | $N_2$ | $O_2$ | $CH_4$ | $CO_2$ | $H_2/N_2$ | $H_2/CH_4$ | $O_2/N_2$ | $CO_2/CH_4$ |
| Aged 56 days[d] | 2700 | 49 | 320 | 37 | 1410 | 56 | 74 | 6.5 | 38 |
| Aged 98 days[d] | 2270 | 57 | 370 | 15 | 1630 | 89 | 126 | 7.4 | 39 |

[a]Polymer film was treated in liquid methanol for about 24 h and then air dried for about 24 h.
[b]Permeation experiments were performed within one week following the treatment.
[c]Results are the average of two films from two separate syntheses.
[d]Polymer film was heated at about 120° C. in a vacuum oven for about 24 h.
[e]Results are the average of three films from three separate syntheses.

The exceptionally high $CO_2/CH_4$ makes it feasible to use CANAL-Me-DMF for biogas treatment, which have $CO_2$ content of > about 40% in some cases. Applications of membrane technology for biogas is currently extremely uncommon due to the low selectivity of industrial membranes, which are generally unable to yield methane streams with high enough purity. Furthermore, $H_2/CH_4$ and $H_2/N_2$ separations are important for hydrogen production, and $O_2/N_2$ separation is important for nitrogen production.

Figure 8:
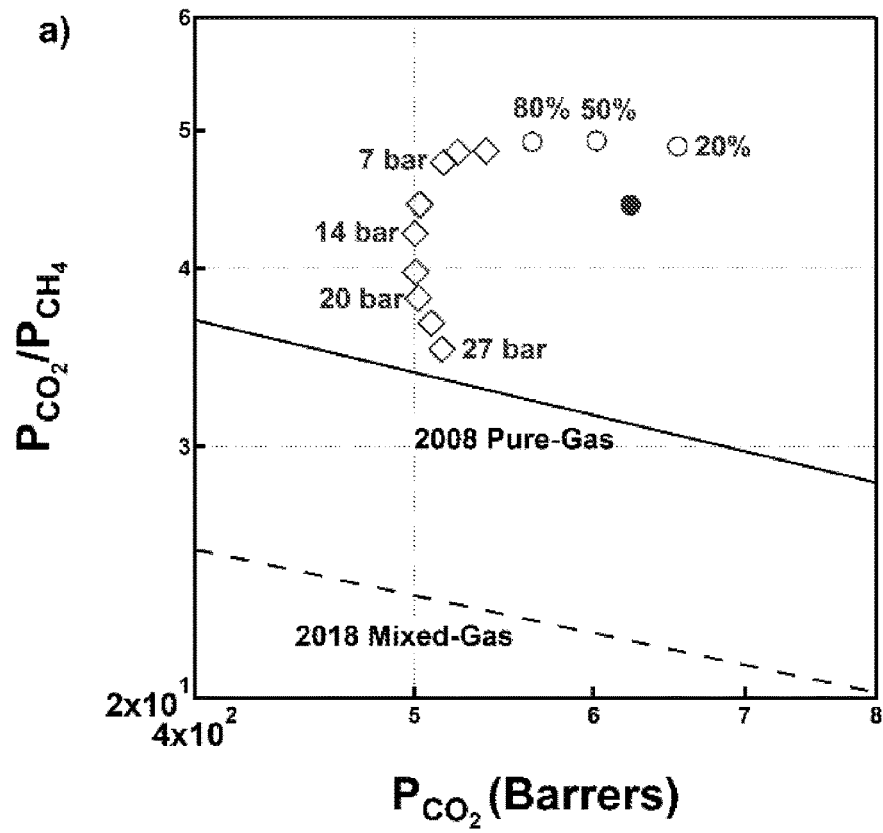
FIG. 8(a) shows mixed-gas permeation properties of CANAL-Me-DMF at 35° C. (50 μm, aged 190 days). Pure-gas (p=1 bar, filled circle), variable-composition $CO_2/CH_4$ mixed-gas (total pressure=2 bar, 20-80% $CO_2$, open circles), and variable-pressure 50/50 $CO_2/CH_4$ mixed-gas permeation results (total pressure=3-27 bar, open diamonds) relative to the 2008 pure-gas (Robeson, L. M., *J. Membr. Sci.* 2008, 320 (1), 390-400) and 2018 mixed-gas (Wang, et al., *Mater. Today Nano* 2018, 3, 69-95) upper bounds.
FIG. 8(b) shows permeability of $CO_2$ (circles) and $CH_4$ (diamonds) under 50/50 $CO_2/CH_4$ mixtures at variable pressure.
Figure 8:
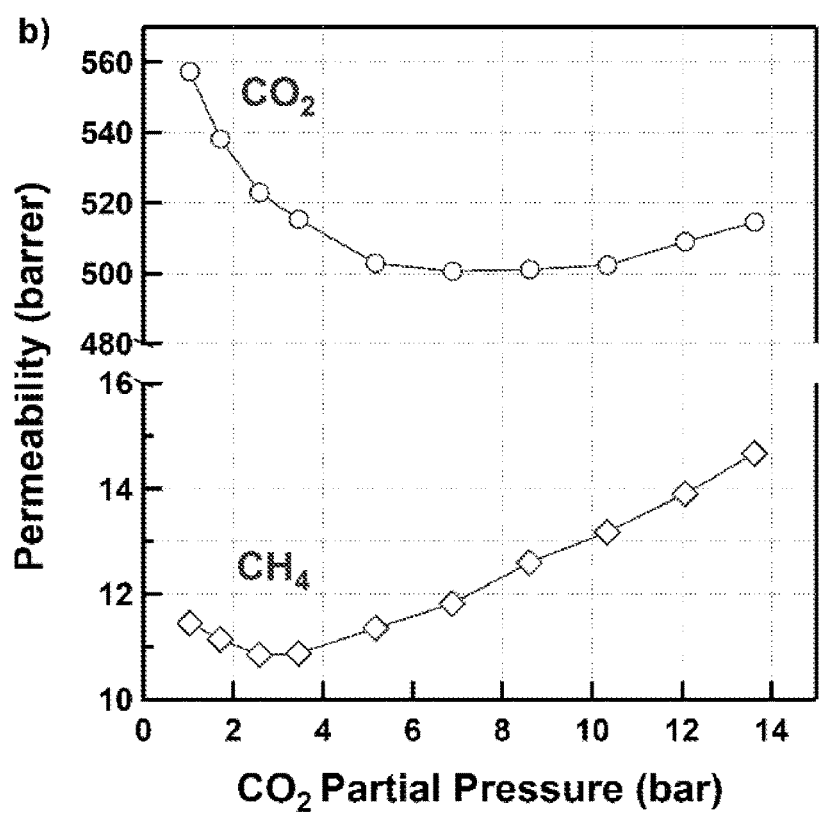

To determine whether CANAL-Me-DMF is susceptible to plasticization, pure-gas permeation experiments are performed with upstream $CO_2$ pressures up to about 17 atm. A clear indication of plasticization is when the permeability increases with increasing upstream pressure. As shown in FIG. 8, no noticeable increase in $CO_2$ permeability was observed up to about 8 bar, demonstrating the high plasticization resistance of CANAL-Me-DMF. Ladder polymers with comparable pure-gas transport properties have been observed to plasticize at lower upstream pressure, resulting in much lower selectivity in mixed-gas permeation experiments. These results indicate that the selectivity of CANAL-Me-DMF will remain high even when exposed to mixed-gas streams.

Figure 2:
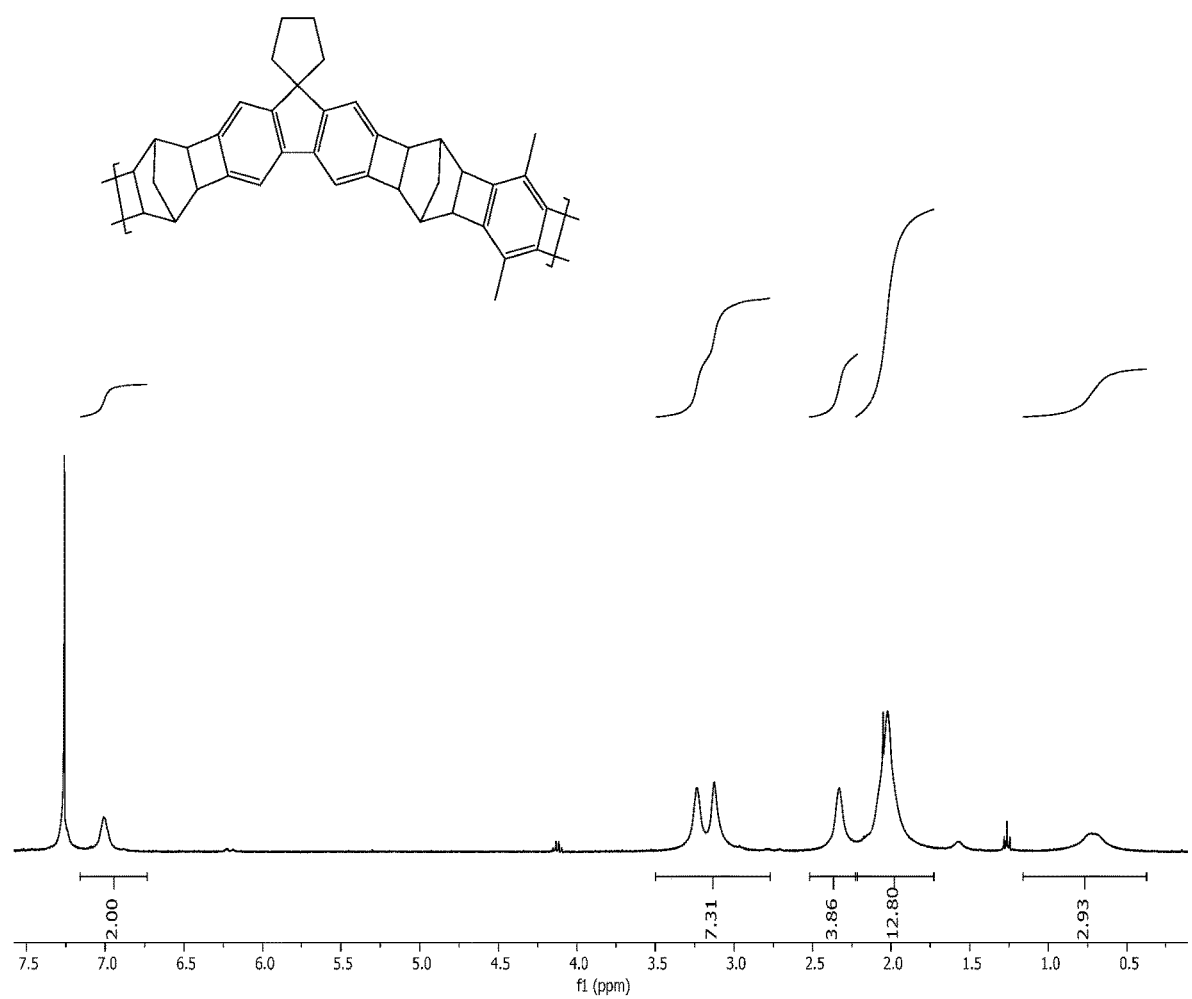
FIG. 2 shows the structure and $^1$H-NMR of CANAL-Me-S5F.

Another example of a fluorene NBC ladder polymer, CANAL-Me-S5F, was synthesized. Its chemical structure and $^1$H-NMR spectrum are shown in FIG. 2.

Figure 3:
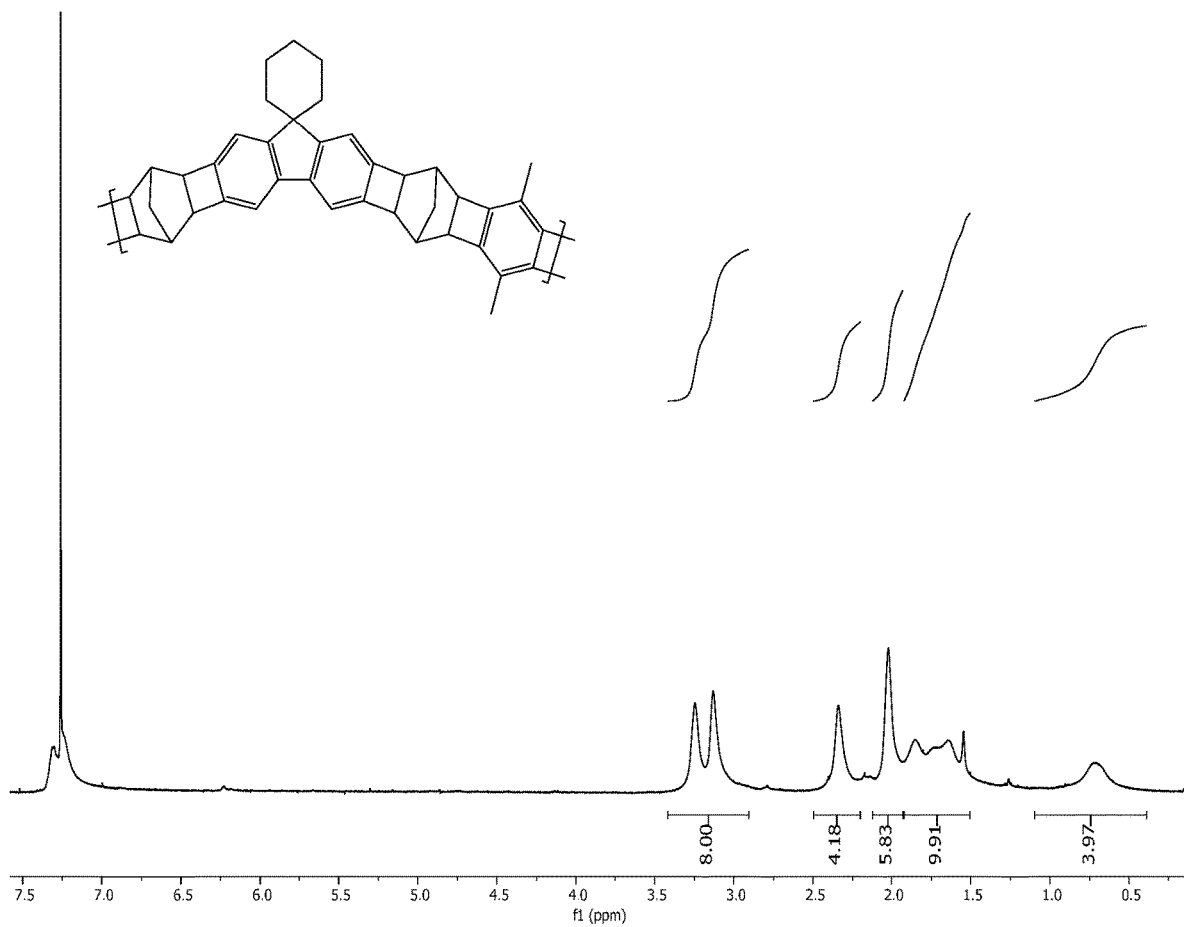
FIG. 3 shows the structure and $^1$H-NMR of CANAL-Me-S6F.

A further example of a fluorene NBC ladder polymer, CANAL-Me-S5F, was synthesized. Its chemical structure and $^1$H-NMR spectrum are shown in FIG. 3.

Definitions

As used herein, the singular terms "a," "an," and "the" include plural referents unless the context clearly dictates otherwise. Thus, for example, reference to an object can include multiple objects unless the context clearly dictates otherwise.

As used herein, the terms "substantially," "substantial," "approximately," and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to +5%, less than or equal to +4%, less than or equal to +3%, less than or equal to +2%, less than or equal to +1%, less than or equal to +0.5%, less than or equal to ±0.1%, or less than or equal to +0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In general, "substituted" refers to an organic group (e.g., an alkyl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. The present disclosure is understood to include embodiments where, for instance a "substituted alkyl" optionally contains one or more alkene and/or alkyne. A substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; aryl groups; heteroaryl groups; cycloalkyl groups; heterocyclyl groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Substituted ring groups such as substituted cycloalkyl, aryl, heterocycle and heteroaryl groups also include rings and fused ring systems in which a bond to a hydrogen atom is replaced with a bond to a carbon atom. Therefore, substituted cycloalkyl, aryl, heterocycle and heteroaryl groups may also be substituted with substituted or unsubstituted alkyl, alkenyl, and alkynyl groups as defined below.

Alkyl groups include straight chain and branched alkyl groups having from 1 to about 20 carbon atoms, and typically from 1 to 12 carbons or, in some embodiments, from 1 to 8, 1 to 6, or 1 to 4 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, and isopentyl groups. Representative substituted alkyl groups may be substituted one or more times with substituents such as those listed herein. As stated above, the present disclosure is understood to include embodiments where, for instance a "substituted alkyl" optionally contains one or more alkene and/or alkyne.

Cycloalkyl groups are cyclic alkyl groups such as, but not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments the number of ring carbon atoms range from 3 to 5, 3 to 6, or 3 to 7. Cycloalkyl groups further include mono-, bicyclic and polycyclic ring systems, such as, for example bridged cycloalkyl groups as described below, and fused rings, such as, but not limited to, decalinyl, and the like. In some embodiments, polycyclic cycloalkyl groups have three rings. Substituted cycloalkyl groups may be substituted one or more times with non-hydrogen and non-carbon groups as defined above. However, substituted cycloalkyl groups also include rings that are substituted with straight or branched chain alkyl groups as defined above. Representative substituted cycloalkyl groups may be mono-substituted or substituted more than once, such as, but not limited to, 2,2-, 2,3-, 2,4-2,5- or 2,6-di-substituted cyclohexyl groups, which may be substituted with substituents such as those listed above. In some embodiments, a cycloalkyl group has one or more alkene bonds, but is not aromatic.

Aryl groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Heterocycle groups include aromatic (also referred to as heteroaryl) and non-aromatic ring compounds containing 3 or more ring members, of which one or more is a heteroatom such as, but not limited to, N, O, S or B. In some embodiments, heterocycle groups include 3 to 20 ring members, whereas other such groups have 3 to 6, 3 to 10, 3 to 12, or 3 to 15 ring members. Heterocycle groups encompass unsaturated, partially saturated and saturated ring systems, such as, for example, imidazolyl, imidazolinyl and imidazolidinyl groups. The phrase "heterocycle group" includes fused ring species including those comprising fused aromatic and non-aromatic groups, such as, for example, benzotriazolyl, 2,3-dihydrobenzo[1,4]dioxinyl, and benzo[1,3]dioxolyl. The phrase also includes bridged polycyclic ring systems containing a heteroatom such as, but not limited to, quinuclidyl. However, the phrase does not include heterocycle groups that have other groups, such as alkyl, oxo or halo groups, bonded to one of the ring members. Rather, these are referred to as "substituted heterocycle groups". Heterocycle groups include, but are not limited to, aziridinyl, azetidinyl, pyrrolidinyl, imidazolidinyl, pyrazolidinyl, thiazolidinyl, tetrahydrothiophenyl, tetrahydrofuranyl, dioxolyl, furanyl, thiophenyl, pyrrolyl, pyrrolinyl, imidazolyl, imidazolinyl, pyrazolyl, pyrazolinyl, triazolyl, tetrazolyl, oxazolyl, isoxazolyl, thiazolyl, thiazolinyl, isothiazolyl, thiadiazolyl, oxadiazolyl, piperidyl, piperazinyl, morpholinyl, thiomorpholinyl, tetrahydropyranyl, tetrahydrothiopyranyl, oxathiane, dioxyl, dithianyl, pyranyl, pyridyl, pyrimidinyl, pyridazinyl, pyrazinyl, triazinyl, dihydropyridyl, dihydrodithiinyl, dihydrodithionyl, homopiperazinyl, quinuclidyl, indolyl, indolinyl, isoindolyl, azaindolyl (pyrrolopyridyl), indazolyl, indolizinyl, benzotriazolyl, benzimidazolyl, benzofuranyl, benzothiophenyl, benzthiazolyl, benzoxadiazolyl, benzoxazinyl, benzodithiinyl, benzoxathiinyl, benzothiazinyl, benzoxazolyl, benzothiazolyl, benzothiadiazolyl, benzo[1,3]dioxolyl, pyrazolopyridyl, imidazopyridyl (azabenzimidazolyl), triazolopyridyl, isoxazolopyridyl, purinyl, xanthinyl, adeninyl, guaninyl, quinolinyl, isoquinolinyl, quinolizinyl, quinoxalinyl, quinazolinyl, cinnolinyl, phthalazinyl, naphthyridinyl, pteridinyl, thianaphthalenyl, dihydrobenzothiazinyl, dihydrobenzofuranyl, dihydroindolyl, dihydrobenzodioxinyl, tetrahydroindolyl, tetrahydroindazolyl, tetrahydrobenzimidazolyl, tetrahydrobenzotriazolyl, tetrahydropyrrolopyridyl, tetrahydropyrazolopyridyl, tetrahydroimidazopyridyl, tetrahydrotriazolopyridyl, and tetrahydroquinolinyl groups. Representative substituted heterocycle groups may be mono-substituted or substituted more than once, such as, but not limited to, pyridyl or morpholinyl groups, which are 2-, 3-, 4-, 5-, or 6-substituted, or disubstituted with various substituents such as those listed above.

Heteroaryl groups are aromatic ring compounds containing 5 or more ring members, of which, one or more is a heteroatom such as, but not limited to, N, O, S or B. Heteroaryl groups include, but are not limited to, groups such as pyrrolyl, pyrazolyl, triazolyl, tetrazolyl, oxazolyl, isoxazolyl, thiazolyl, pyridyl, pyridazinyl, pyrimidinyl, pyrazinyl, thiophenyl, benzothiophenyl, furanyl, benzofuranyl, indolyl, azaindolyl (pyrrolopyridyl), indazolyl, benzimidazolyl, imidazopyridyl (azabenzimidazolyl), pyrazolopyridyl, triazolopyridyl, benzotriazolyl, benzoxazolyl, benzothiazolyl, benzothiadiazolyl, imidazopyridyl, isoxazolopyridyl, thianaphthalenyl, purinyl, xanthinyl, adeninyl, guaninyl, quinolinyl, isoquinolinyl, tetrahydroquinolinyl, quinoxalinyl, and quinazolinyl groups. Although the phrase "heteroaryl groups" includes fused ring compounds such as indolyl and 2,3-dihydro indolyl, the phrase does not include heteroaryl groups that have other groups bonded to one of the ring members, such as alkyl groups. Rather, heteroaryl groups with such substitution are referred to as "substituted heteroaryl groups." Representative substituted heteroaryl groups may be substituted one or more times with various substituents such as those listed above.

Those of skill in the art will appreciate that compounds of the invention may exhibit the phenomena of tautomerism, conformational isomerism, geometric isomerism and/or optical isomerism. As the formula drawings within the specification and claims can represent only one of the possible tautomeric, conformational isomeric, optical isomeric or geometric isomeric forms, it should be understood that the invention encompasses any tautomeric, conformational isomeric, optical isomeric and/or geometric isomeric forms of the compounds having one or more of the utilities described herein, as well as mixtures of these various different forms.

As readily understood by one skilled in the art, a wide variety of functional groups and other structures may exhibit tautomerism, and all tautomers of compounds as described herein are within the scope of the present invention.

Stereoisomers of compounds, also known as "optical isomers," include all chiral, diastereomeric, and racemic forms of a structure, unless the specific stereochemistry is expressly indicated. Thus, compounds used in the present invention include enriched or resolved optical isomers at any or all asymmetric atoms as are apparent from the depictions. Both racemic and diastereomeric mixtures, as well as the individual optical isomers can be isolated or synthesized so as to be substantially free of their enantiomeric or diastereomeric partners, and these are all within the scope of the invention.

While the disclosure has been described with reference to the specific embodiments thereof, it should be understood by those skilled in the art that various changes may be made and equivalents may be substituted without departing from the true spirit and scope of the disclosure as defined by the appended claim(s). In addition, many modifications may be made to adapt a particular situation, material, composition of matter, method, operation or operations, to the objective, spirit and scope of the disclosure. All such modifications are intended to be within the scope of the claim(s) appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations are not a limitation of the disclosure.

What is claimed is:

1. A ladder polymer comprising at least one unit having a structure selected from:

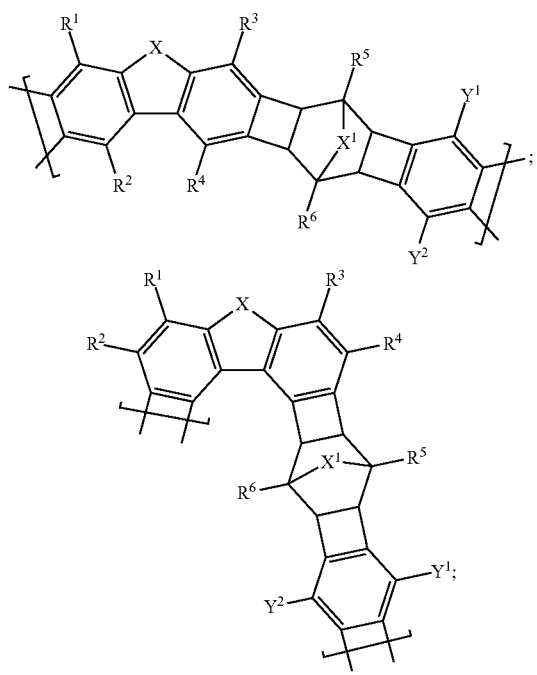

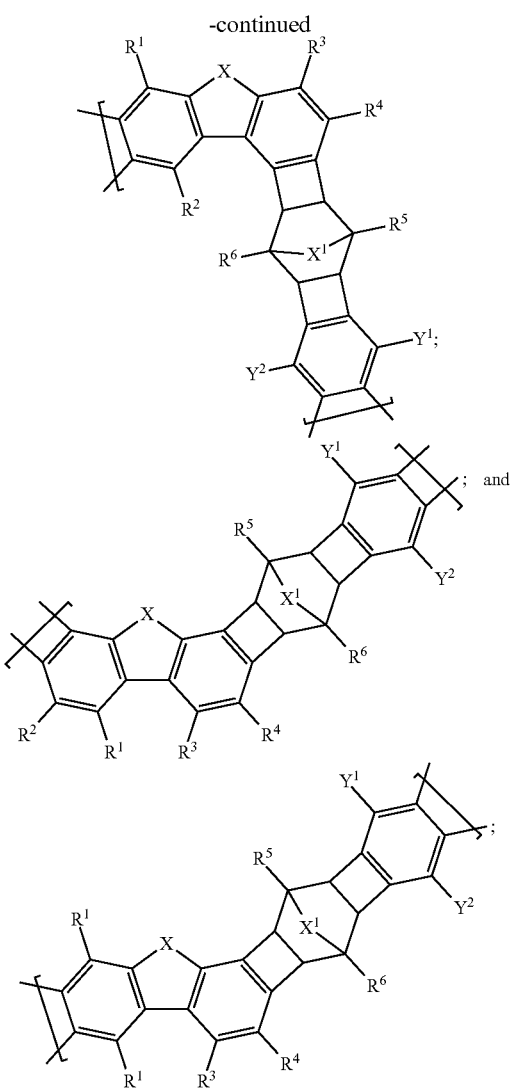

wherein X is selected from alkylene groups, —[O]—, —[S]—, nitrogen-containing groups, and cyclic groups, wherein $Y^1$ and $Y^2$ are independently selected from alkyl groups, wherein $R^1$, $R^2$, $R^3$, $R^4$, $R^5$, and $R^6$ are independently selected from hydride group, alkyl groups, aryl groups, heterocyclic groups, halogen groups, groups including a —O— moiety, groups including a —O(CO)— moiety, groups including a —O(CO)O— moiety, groups including a —O(CO)N< moiety), groups including a —S— moiety, groups including a —B< moiety, —$NO_2$, groups including a —N< moiety, groups including a —P< moiety, groups including a —(PO)< moiety, —CHO, groups including a —(CO)— moiety, groups including a —(CO)O— moiety, groups including a —(CO)N< moiety, and groups including a —Si≡ moiety, and wherein $X^1$ is selected from —[O]—, —[S]—, —[B(O)$R^a$]—, —[$NR^a$]—, —[P(O)$R^a$]—, —[(PO)(O)$R^a$]—, —[CO]—, —[$CR^aR^b$]—, —[C(O)$R^a$(O)$R^b$]—, and —[Si(O)$R^a$(O)$R^b$]—, and $R^a$ and $R^b$ are independently selected from hydride group, alkyl groups, aryl groups, and heterocyclic groups.

2. The ladder polymer of claim 1, wherein $Y^1=Y^2$, $X^1$ is —[CH$_2$]—, and $R^1=R^2=R^3=R^4=R^5=R^6$=hydride group.

3. The ladder polymer of claim 2, represented by:

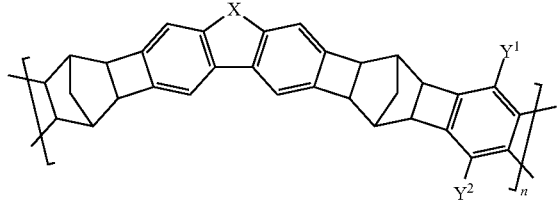

wherein n is an integer that is greater than 1.

4. The ladder polymer of claim 2, represented by:

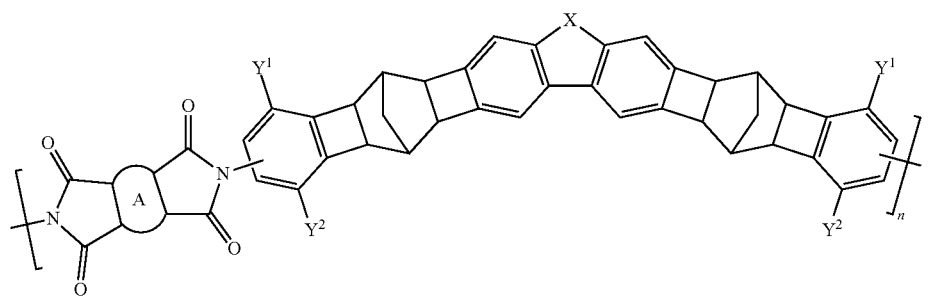

wherein A is an aromatic group, and
wherein n is an integer that is greater than 1.

5. The ladder polymer of claim 2, represented by:

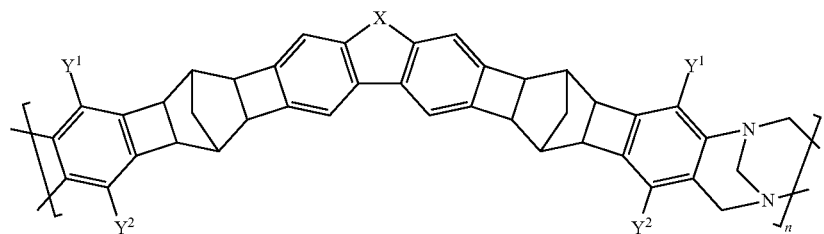

wherein n is an integer that is greater than 1.

6. A ladder polymer comprising at least one unit having a structure selected from:

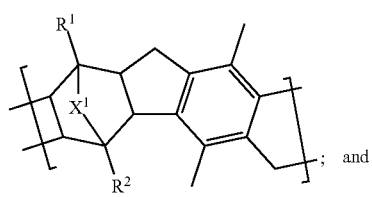; and

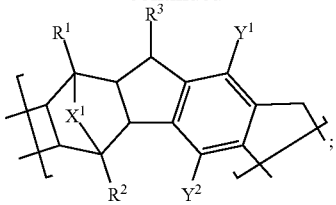;

wherein $Y^1$ and $Y^2$ are independently selected from alkyl groups;
wherein $R^1$, $R^2$, and $R^3$ are independently selected from hydride group, alkyl groups, aryl groups, heterocyclic groups, halogen groups, groups including a —O— moiety, groups including a —O(CO)— moiety, groups including a —O(CO)O— moiety, groups including a —O(CO)N< moiety), groups including a —S— moiety, groups including a —B< moiety, —NO$_2$, groups including a —N< moiety, groups including a —P< moiety, groups including a —(PO)< moiety, —CHO, groups including a —(CO)— moiety, groups including a —(CO)O— moiety, groups including a —(CO)N< moiety, and groups including a —Si≡ moiety, and wherein $X^1$ is selected from —[O]—, —[S]—, —[B(O)R$^a$]—, —[NR$^a$]—, —[P(O)R$^a$]—, —[(PO)(O)R$^a$]—, —[CO]—, —[CR$^a$R$^b$]—, —[C(O)R$^a$(O)R$^b$]—, and —[Si(O)R$^a$(O)R$^b$]—, and R$^a$ and R$^b$ are independently selected from hydride group, alkyl groups, aryl groups, and heterocyclic groups.

7. The ladder polymer of claim 6, wherein $R^1=R^2$=hydride group, and $X^1$ is —[CH$_2$]—.

8. The ladder polymer of claim 7, represented by:

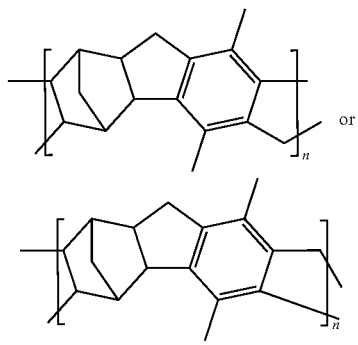

wherein n is an integer that is greater than 1.

9. A ladder polymer comprising at least one unit having a structure selected from:

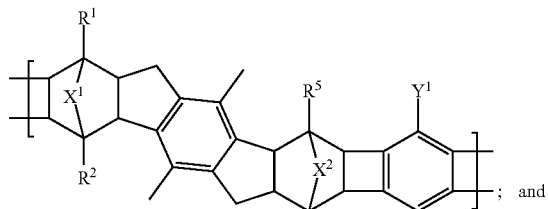

; and

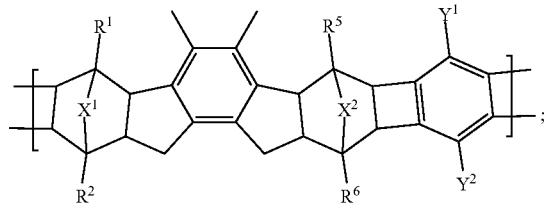

;

wherein $Y^1$ and $Y^2$ are independently selected from alkyl groups, wherein $R^1$, $R^2$, $R^5$, and $R^6$ are independently selected from hydride group, alkyl groups, aryl groups, heterocyclic groups, halogen groups, groups including a —O— moiety, groups including a —O(CO)— moiety, groups including a —O(CO)O— moiety, groups including a —O(CO)N< moiety), groups including a —S— moiety, groups including a —B< moiety, —NO$_2$, groups including a —N< moiety, groups including a —P< moiety, groups including a —(PO)< moiety, —CHO, groups including a —(CO)— moiety, groups including a —(CO)O— moiety, groups including a —(CO)N< moiety, and groups including a —Si≡ moiety, and wherein $X^1$ and $X^2$ are independently selected from —[O]—, —[S]—, —[B(O)R$^a$]—, —[NR$^a$]—, —[P(O)R$^a$]—, —[(PO)(O)R$^a$]—, —[CO]—, —[CR$^a$R$^b$]—, —[C(O)R$^a$(O)R$^b$]—, and —[Si(O)R$^a$(O)R$^b$]—, and R$^a$ and R$^b$ are independently selected from hydride group, alkyl groups, aryl groups, and heterocyclic groups.

10. The ladder polymer of claim 9, wherein $R^1$=$R^2$=$R^5$=$R^6$=hydride group, $X^1$=$X^2$=—[CH$_2$]—, and $Y^1$=$Y^2$=—CH$_3$.

11. The ladder polymer of claim 10, represented by:

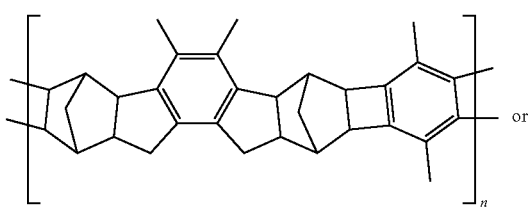

or

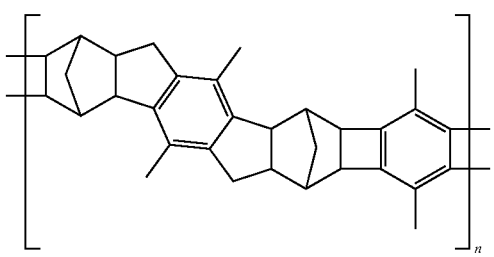

wherein n is an integer that is greater than 1.

12. The ladder polymer of claim 1 comprising at least one unit having the structure:

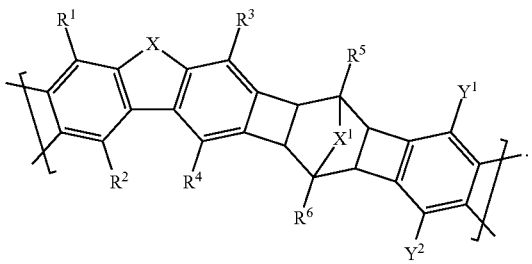

13. The ladder polymer of claim 1 comprising at least one unit having the structure:

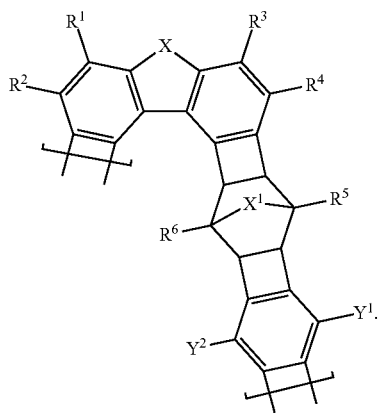

14. The ladder polymer of claim 1 comprising at least one unit having the structure:

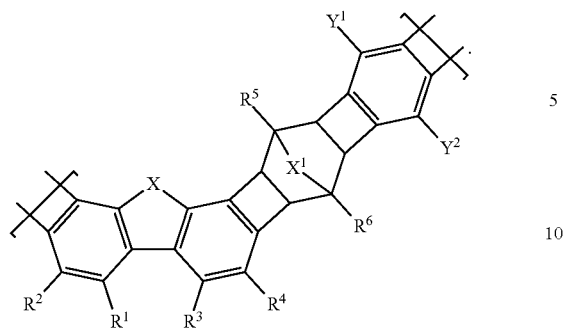
15. A membrane for gas separation, comprising the ladder polymer of claim 1.
* * * * *